US008086713B2

(12) United States Patent
Gandhewar et al.

(10) Patent No.: US 8,086,713 B2
(45) Date of Patent: Dec. 27, 2011

(54) DETERMINING A SUBSCRIBER DEVICE HAS FAILED GRACELESSLY WITHOUT ISSUING A DHCP RELEASE MESSAGE AND AUTOMATICALLY RELEASING RESOURCES RESERVED FOR THE SUBSCRIBER DEVICE WITHIN A BROADBAND NETWORK UPON DETERMINING THAT ANOTHER SUBSCRIBER DEVICE REQUESTING THE RESERVATION OF A NETWORK ADDRESS HAS THE SAME CONTEXT INFORMATION AS THE FAILED SUBSCRIBER DEVICE

(75) Inventors: Sunil Gandhewar, Nashua, NH (US);
Sanjay Wadhwa, Acton, MA (US);
William Townsend, Groton, MA (US);
John Liddy, Gardner, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 170 days.

(21) Appl. No.: 12/367,319

(22) Filed: Feb. 6, 2009

(65) Prior Publication Data

US 2010/0191813 A1   Jul. 29, 2010

Related U.S. Application Data

(60) Provisional application No. 61/147,912, filed on Jan. 28, 2009.

(51) Int. Cl.
*G01R 31/08* (2006.01)
*G06F 15/16* (2006.01)
*G06F 15/173* (2006.01)
*H04L 12/28* (2006.01)

(52) U.S. Cl. ......... 709/223; 370/218; 370/254; 709/245
(58) Field of Classification Search ................. 709/245, 709/223; 370/218, 254
See application file for complete search history.

(56) References Cited

U.S. PATENT DOCUMENTS 6,578,074 B1 *   6/2003   Bahlmann .................... 709/220
(Continued)

OTHER PUBLICATIONS

Juniper Networks, Inc., "JUNOS Software Subscriber Access Configuration Guide—DHCP Auto Logout Overview", Release 9.4, Jan. 15, 2009, retrieved from the Internet: URL: http://www.juniper.net/techpubs/en_US/junos9.4/information-products/topic-collections/subscriber-access/swconfig-subscriber-access.pdf, 38 pp.

(Continued)

*Primary Examiner* — David England
*Assistant Examiner* — Daniel Murray
(74) *Attorney, Agent, or Firm* — Shumaker & Sieffert, P.A.

(57) ABSTRACT

In general, techniques are described for automatically releasing network resources reserved for use by network devices within a network. In particular, a network device, such as a router, may include an interface card that receives a first and a second message from respective first and second client devices requesting reservation of network resources. The first message may include a first identifier, while the second message may include a second identifier. Both messages however may also include the same additional context information that identifies the same context in which the first client device operates. The router may include a control unit that determines whether the additional context information included within the first and second messages is the same. Based on a determination that this information is the same, the control unit may automatically release resources reserved for use by the first client device within the network.

32 Claims, 5 Drawing Sheets

U.S. PATENT DOCUMENTS

| | | | |
|---|---|---|---|
| 6,957,276 B1 * | 10/2005 | Bahl | 709/245 |
| 6,982,953 B1 * | 1/2006 | Swales | 370/218 |
| 7,178,059 B2 * | 2/2007 | Greenspan et al. | 714/13 |
| 7,321,893 B1 * | 1/2008 | Rambacher et al. | 1/1 |
| 7,386,629 B2 * | 6/2008 | Rover et al. | 709/238 |
| 7,533,165 B2 * | 5/2009 | Makino | 709/223 |
| 7,536,450 B2 * | 5/2009 | Motoyama et al. | 709/223 |
| 7,609,690 B2 * | 10/2009 | Ogata | 370/389 |
| 7,648,070 B2 * | 1/2010 | Droms et al. | 235/451 |
| 7,778,203 B2 * | 8/2010 | Zhao et al. | 370/254 |
| 2005/0253718 A1 * | 11/2005 | Droms et al. | 340/572.1 |
| 2005/0253722 A1 * | 11/2005 | Droms et al. | 340/572.1 |
| 2006/0031488 A1 * | 2/2006 | Swales | 709/224 |
| 2006/0047791 A1 * | 3/2006 | Bahl | 709/220 |
| 2006/0155563 A1 * | 7/2006 | Banerjee et al. | 705/1 |
| 2007/0002833 A1 * | 1/2007 | Bajic | 370/352 |
| 2007/0214352 A1 * | 9/2007 | Convery et al. | 713/153 |
| 2008/0046597 A1 * | 2/2008 | Stademann et al. | 709/249 |
| 2010/0042707 A1 * | 2/2010 | Zhao | 709/221 |
| 2010/0042714 A1 * | 2/2010 | Choi et al. | 709/223 |

OTHER PUBLICATIONS

Droms, R., "Dynamic Host Configuration Protocol", RFC 2131, IETF Standard, Internet Engineering Task Force, Mar. 1997, 46 pp.

Alexander, S. et al., "DHCP Options and BOOTP Vendor Extensions", RFC 2132, IETF Standard, Internet Engineering Task Force, Mar. 1997, 35 pp.

Patrick, M., "DHCP Relay Agent Information Option", RFC 3046, IETF Standard, Internet Engineering Task Force, Jan. 2001, 15 pp.

Extended European Search Report for EP Application No. 1051121.0 dated Jun. 6, 2010, 7 pp.

* cited by examiner

… (1)

DETERMINING A SUBSCRIBER DEVICE HAS FAILED GRACELESSLY WITHOUT ISSUING A DHCP RELEASE MESSAGE AND AUTOMATICALLY RELEASING RESOURCES RESERVED FOR THE SUBSCRIBER DEVICE WITHIN A BROADBAND NETWORK UPON DETERMINING THAT ANOTHER SUBSCRIBER DEVICE REQUESTING THE RESERVATION OF A NETWORK ADDRESS HAS THE SAME CONTEXT INFORMATION AS THE FAILED SUBSCRIBER DEVICE

This application claims the benefit of U.S. Provisional Application No. 61/147,912, filed Jan. 28, 2009, the entire content of which is incorporated herein by reference.

TECHNICAL FIELD

The invention relates to computer networks and, more particularly, reserving resources for use by network devices within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

To route the packets through the computer network, each network device may be assigned an address that uniquely identifies each of the requesting network devices. Each packet may then include a source address uniquely identifying the network device that originated the packet and a destination address uniquely identifying the network device to which the packet is destined. Intermediate devices, referred to as routers, may route the packets to the destination device based on the destination address included within the packet.

Typically, each network device, upon attempting to access the network, may request configuration information that includes an Internet Protocol (IP) address in accordance with a Dynamic Host Configuration Protocol (DHCP). For example, a subscriber device (e.g., a cable modem, a digital television setup box, a Digital Subscriber Line (DSL) modem) may request a layer three IP network address by issuing a DHCP request. A DHCP server that maintains an IP address space may receive this request, reserve an IP address with the IP address space, assign the IP address to the requesting network device, and forward a response back to the network device assigning the reserved IP address to the requesting network device. Often, the DHCP server may reserve the IP address for use by the requesting network device for a fixed, often long, duration of time. This "lease," as the reservation may commonly be referred, may extend for hours or possibly days, assuring the requesting network device of a pseudo-static IP address.

However, if, for some reason, the requesting network device is replaced with a different network device, the DHCP server may be unable to identify the replacement network device and reassign the lease with the requesting network device to the replacement network device. The replacement network device may then request an address from the DHCP server, whereupon the DHCP server may reserve another IP address different from the IP address assigned to the replaced network device and assign this other IP address to the replacement network device. The DHCP server may assign this other IP address without releasing the lease of the previous IP address to the replaced network device. In this respect, the DHCP server may inefficiently maintain the lease for the replaced network device even though this replaced network device no longer operates within the computer network.

SUMMARY

In general, techniques are described for automatically releasing network resources reserved for use by a failed or non-operational client device. An intermediate network device, such as a relay device or a router that implements or includes an integrated relay device, positioned between the client device and a layer three network address allocation device (e.g., a DHCP server) may implement the techniques to automatically, e.g., without user or administrator input or intervention, issue a release message to a network address allocation device that maintains leases of network resources. The network device may monitor network communication and detect the failure of the original client device and successive replacement of the original client device with a new client device. The network device may also determine that the original client device did not fail gracefully, e.g., by failing to send a release message to release network resources reserved for use by the original client device. Upon determining this "graceless" failure of the original client device, the network device may, on behalf of the original client device, issue a release message to the address allocation device so as to release any network resources reserved by the server for use by the first client device. In this respect, the network device or other intermediate network device may promote more efficient use and re-use of network resources within a network. As one example, the techniques may be used by a network device deployed within a broadband access network to automatically release layer three IP addresses from a DHCP server when the network device detects the graceless failure of a subscriber device, such as a cable modem, DSL modem or digital television setup box.

In operation, the network device may implement the automatic resource release techniques to improve, for example, re-use of layer three IP addresses reserved by way of a Dynamic Host Configuration Protocol (DHCP). The network device may represent, in this instance, an intermediate network device positioned between subscriber devices and a DHCP server and which implements DHCP to relay DHCP messages between the subscriber device and DHCP server. The network device may receive, from a first one of the subscriber device, a first DHCP message, e.g., a DHCP request message, that includes either a layer two L2 hardware network address or a client identifier, each of which may uniquely identify the first subscriber device and additional context information describing a context in which the first subscriber device operates. The L2 hardware address may for example comprise a Media Access Control (MAC) address assigned to network interface included within the first subscriber device, while the client identifier may comprise a telephone number or other unique identifier. Generally, each of the L2 hardware address and client identifier may be characterized as an identifier that uniquely identifies the client.

The DHCP message may define the additional context information as an optional and extensible option 60 field that identifies a Vendor Class Identifier (VCI). The intermediate network device may intercept this message and automatically modify this message by inserting additional context information in the form of circuit context data. For example, the network device may utilize option 82 field to include circuit context data to encode local identification of a circuit (e.g. a physical or a logical interface number or v-lan identifier) on which the DHCP message was received by the intermediate device. Further, the option 82 field may also contain information specified by the particular subscriber device with respect to the circuit, such as data encoding a remote host end of the circuit (e.g. a caller ID telephone number or a modem ID of a cable modem). The collective data stored in option 82 field after updating by the network device, including the relay agent local identification of the circuit, is referred to herein as the circuit context information.

Further, in response to intercepting this message, the network device may maintain at least one table that includes an entry by which to specify a first set of associations between the MAC address and the additional context information added by the network device. The network device may, after forwarding the updated DHCP message, intercept a DHCP response from the DHCP server and, from the response, determine an L3 IP address or other network resource reserved for use by the first subscriber device within the network. Upon intercepting the response, the network device updates the first set of associations within its internal table to associate the L2 MAC address and additional context information of the first subscriber device to the L3 IP address assigned to the device.

The network device may subsequently intercept a second DHCP message, e.g., a DHCP request, from a second subscriber device, where the DHCP message specifies either a second client identifier or a second L2 network address, e.g., a hardware MAC address, and the same additional vender as well as circuit context information. The network device parses the second DHCP message to identify the second hardware address (i.e., the L2 network address) and performs a lookup in its internal table to determine if the hardware address is associated with any currently assigned L3 network addresses. Assuming the second subscriber device was not previously active within the network and moreover that the second subscriber device replaced the first subscriber device, the lookup may fail. However, the network device may parse the second DHCP message to identify the additional context information and perform a lookup in its table using this additional context information. As the additional context information is the same (e.g., the same vendor context information identifying the vendor as well as the same circuit context information identifying the circuit on which the DHCP message was received), related or at least similar within both the first and second DHCP messages the second lookup may succeed and the network device may identify the association previously created within its internal table for the first DHCP client device.

Based on this determination that the additional context information included within different DHCP messages is the same, the network device may determine that the first subscriber device failed gracelessly, e.g., without releasing the first IP address reserved for use by the subscriber device. The intermediate network device may then automatically release the IP address assigned to the first subscriber device by generating, on behalf of the first subscriber device, a DHCP release message that requests release of the lease reserving the first IP address for use by the first subscriber device. The network device forwards this DHCP release message to the DHCP server, which proceeds to release the first IP address reserved for use by the first subscriber device. The network device may next update its internal table to remove the first set of associations so as to mirror the lease assignments by the DHCP server. In this manner, the network device may perform the automatic resource release techniques to promote more efficient use of network resources, such as layer three IP addresses, within the network.

In one embodiment, a method comprises receiving, with a network device of a network, a first message, from a first client device of the network, requesting that a first layer three (L3) network address be reserved for the first client device, wherein the first message includes a first identifier that uniquely identifies the first client device and additional context information that identifies a context in which the first client device operates and receiving, with the network device, a second message, from a second client device of the network different from the first client device, requesting that a second L3 network address be reserved for use by the second client device within the network, wherein the second message includes a second identifier different from the first L2 hardware address that uniquely identifies the second client device and the same additional context information that identifies the same context in which the first client device operates. The method also comprises determining, with the network device, whether the additional information included within each of the first and the second messages is the same; and automatically releasing, with the network device, the first network resource reserved for use by the second network device within the network based on the determination that the additional information within the first and the second messages is the same.

In other embodiment, a network device included within a network comprises at least one interface card that (1) receives a first message, from a first client device of the network, requesting that a first layer three (L3) network address be reserved for use by the first client device within the network, wherein the first message includes a first identifier that uniquely identifies the first client device and additional context information that identifies a context in which the first client device operates and (2) receives a second message, from a second client device of the network different from the first client device, requesting that a second L3 network address be reserved for use by the second client device within the network, wherein the second message includes a second identifier different from the first identifier that uniquely identifies the second client device and the same additional context information that identifies the same context in which the first client device operates. The network device further comprises a control unit that determines whether the additional information included within each of the first and the second messages is the same and automatically releases the first network resource reserved for use by the second network device within the network based on the determination that the additional information within the first and the second messages is the same.

In another embodiment, a network system comprises a network, a sub-network that includes a first and a second client device, and a network device. The network device comprises at least one interface card that (1) receives a first message, from a first client device of the network, requesting that a first layer three (L3) network address be reserved for use by the first client device within the network, wherein the first message includes a first identifier that uniquely identifies the first client device and additional context information that identifies a context in which the first client device operates and (2) receives a second message, from a second client device of the network different from the first client device, requesting that a second L3 network address be reserved for use by the second client device within the network, wherein the second message includes a second identifier different from the first identifier that uniquely identifies the second client device and the same additional context information that identifies the same context in which the first client device operates. The network device further comprises a control unit that determines whether the additional information included within each of the first and the second messages is the same and automatically releases the first network resource reserved for use by the second network device within the network based on the determination that the additional information within the first and the second messages is the same.

In another embodiment, a computer-readable storage medium comprising instruction for causing a programmable processor to receive, with a network device of a network, a first message, from a first client device of the network, requesting that a first layer three (L3) network address be reserved for the first client device, wherein the first message includes a first layer two (L2) hardware address that uniquely identifies the first client device and additional context information that identifies a context in which the first client device operates and receive, with the network device, a second message, from a second client device of the network different from the first client device, requesting that a second L3 network address be reserved for use by the second client device within the network, wherein the second message includes a second L2 hardware address different from the first L2 hardware address that uniquely identifies the second client device and the same additional context information that identifies the same context in which the first client device operates. The instructions further cause the programmable processor to determine, with the network device, whether the additional information included within each of the first and the second messages is the same, and automatically release, with the network device, the first network resource reserved for use by the second network device within the network based on the determination that the additional information within the first and the second messages is the same.

In another embodiment, a method comprises receiving, with an intermediate network device positioned between a subscriber device and a network address allocation device within a network, a network message from the subscriber device requesting that a layer three (L3) network address be reserved for use by the subscriber device within the network, wherein the network message includes a layer two (L2) hardware address that uniquely identifies the second client device and vendor context information that identifies a vendor of the subscriber device and determining, with the intermediate device, an L2 circuit by which the network message was received. The method further comprises accessing a data structure within the intermediate network device to identify a second L3 network address that is currently assigned for use within the network and associated with the same vendor context information specified in the network message and the same L2 circuit by which the intermediate network device received the network message, and generating and outputting, with the intermediate device, a message requesting the network address allocation device release of the second L3 network address.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
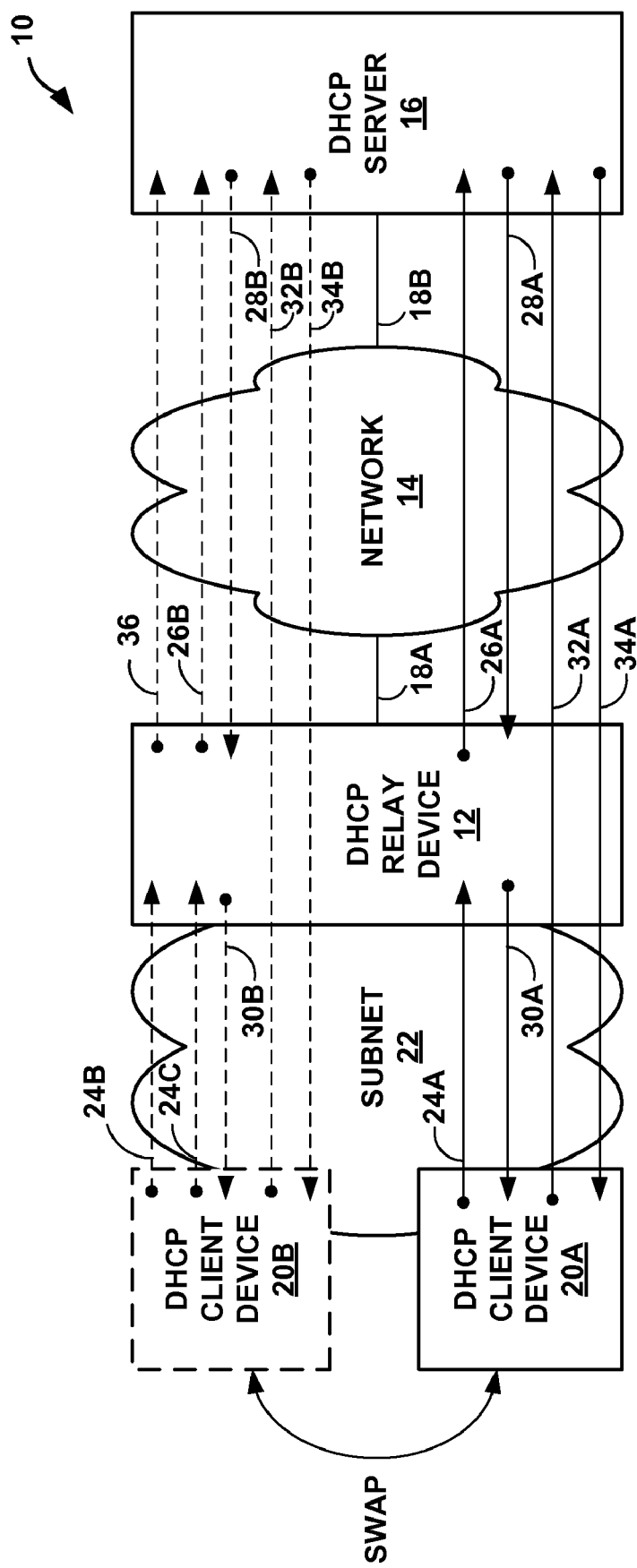
FIG. 1 is a block diagram illustrating an exemplary network system in which an intermediate DHCP relay device implements the automatic resource release techniques described in this disclosure.

FIG. 1 is a block diagram illustrating an exemplary network system 10 in which an intermediate network device 12 implements the automatic resource release techniques described in this disclosure. In the example of FIG. 1, device 12 is shown as a Dynamic Host Configuration Protocol (DHCP) relay device 12, however, the automatic resource release techniques may be implemented by any network device, such as a server, a router, a switch, a hub, a computer or any other device capable of receiving and communicating messages for the reservation of resources within a network system, such as network system 10. Moreover, while described with respect to a particular protocol for reserving resource, e.g., DHCP, the techniques may apply to any network address allocation protocol by which a network device may request and reserve network addresses for operating within network system 10.

As shown further in the example of FIG. 1, network system 10 includes a network 14 and a DHCP server 16, where DHCP relay device 12 and a DHCP server 16 couple to network 14 via respective network links 18A, 18B. Network 14 may represent any publically accessible computer network, such as the Internet. Network 14 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection. Typically, these devices communicate with one another via a packet-based protocol, such as an Internet Protocol (IP)/Transmission Control Protocol (TCP). As a result, network 14 may represent or be referred to as a "packet-based" or an "IP packet-based" computer network.

DHCP server 16 may represent a network device that allocates layer three network addresses (e.g., IP network addresses) for network system 10. In particular, DHCP server 16 may maintain access to an address pool, such as an Internet Protocol (IP) address pool. DHCP server 16 may also maintain access to other resources, such as configuration files that provide pertinent configuration information. DHCP server 16 may reserve an IP address within the IP address pool for use by one or more DHCP clients, such as DHCP client devices 20A, 20B ("DHCP client devices 20"), in accordance with DHCP, as described in more detail below.

Network system 10 may further include DHCP clients 20, each of which couple to DHCP relay 12 via one or more connections (not shown) included within sub-network 22 ("subnet 22"). DHCP client devices 20 may each represent a subscriber device, such as one or more of a Set-Top Box (STB), a personal computer, a laptop computer, a modem, a workstation, a personal digital assistant (PDA), a cellular phone or other mobile device (e.g., a so-called "smart phone") or any other device capable of accessing a network, such as network 14. These devices 20 may be "DHCP clients" in that these devices implement DHCP to request, as a client to the DHCP server or host device 16, L3 network addresses (e.g., IP addresses) and other resources maintained by DHCP server 16 useful or required for operating within network system 10.

Subnet 22 may represent a portion of a larger network, which is not shown in FIG. 1 for ease of illustration purposes, hence the name "subnet." The larger network may be generally referred to as an access network in that this network enables client devices to access network 14. As subnet 22 comprises a portion of this access network and similarly facilitates access of network 14 by client devices 20, subnet 22 may similarly be referred to as an access network. Generally, access networks implement IP, and with respect to IP, subnets or IP subnets, such as subnet 22, may be identified by an IP address prefix.

An IP subnet may represent a "network area" in that the IP subnet may be identified by a contiguous set of IP addresses or an IP prefix that defines a distinct area within an IP address space of the larger access network. The IPv4 address space comprises $2^{32}$ distinct IP addresses, as each IP address may correspond to a 32-bit binary number. Typically, an IP address is presented in four eight bit binary numbers (or, in other words, four bytes) with each eight bit binary number or byte separated by a period (.), which is a notation referred to as a quad-dotted decimal representation. For example, one IP address may be presented as 10.0.0.1. However, as a byte may represent a number as large as $2^8-1$ or $255_{10}$, each byte may represent a range of numbers from 0 to 255 in decimal, such that each IP address may vary from 0.0.0.0 to 255.255.255.255 again in quad-dotted decimal representation or notation.

An IP prefix identifies a subset of addresses with the IP address space and those addresses may be assigned to devices within a particular area within the larger access network. An IP prefix usually identifies a contiguous set of IP addresses within the IP address space. For example, an IP prefix may identify a contiguous set of IP addresses from 10.0.0.1 to 10.0.0.255. This IP prefix may be represented by a routing prefix or 10.0.0 followed by a subnet mask identifier (which in this instance may be represented as $24_{10}$ to indicate that the first 24 bits should be 1's within the subnet mask, e.g., 255.255.255.0 in quad-dotted decimal notation), where the prefix and scope identifier may be separated by a slash (/). The IP prefix may therefore be presented as 10.0.0/24 suggesting that only the first 24 bits of the 32-bit IP address are necessary to reach the IP subnet (or area) corresponding to the IP prefix. In this instance, the IP prefix may define a routing prefix and may represent a summarized version of the contiguous set of IP addresses.

According to DHCP, each subnet, such as subnet 22, requires either a DHCP server, such as DHCP server 16, or a DHCP relay device, such as DHCP relay device 12, by which to reserve and assign IP addresses to network devices, such as DHCP client devices 20, operating within the respective subnet. As DHCP servers may maintain network resources for a large number of DHCP clients, often, for small subnets, network administrators will utilize one or more DHCP servers or server clusters to service a number of subnets. To do so, the network administrators may maintain one DHCP server, such as DHCP server 16, in a central location and then configure multiple DHCP relay devices, one or more for each subnet, to relay DHCP messages from DHCP clients located within the respective one of the subnets to the single DHCP server or server cluster.

Typically, in these instances, a router or other network device already present within each subnet may provide this DHCP relay service as an optional service that the network administrators may enable in this context. In this respect, DHCP relay device 12 may represent a router or some other similar network device, such as a switch or a hub that provides this DHCP relay service as an optional service. Alternatively, DHCP relay device 12 may represent a dedicated relay device and may comprise any device capable of relaying DHCP messages in the manner described below in more detail. Thus, DHCP relay device 12 may represent any intermediate network device positioned between DHCP client devices 20 and DHCP server 16 that implements DHCP to relay DHCP messages between DHCP clients 20 and DHCP server 16.

While described herein with respect to an intermediary DHCP relay device 12, the techniques may be employed by DHCP server 16 in instances where DHCP client devices 20 reside in the same subnet or network as DHCP server 16. Alternatively, in some instances, DHCP relay device 12 may implement only a portion of the techniques described below. Particularly, when DHCP relay device 12 is in a transparent snooping mode, DHCP relay device 12 may not issue any messages that otherwise alert DHCP client devices 20 and DHCP server 16 to its presence in the network, as it is transparent to client devices 20 and server 16. The techniques are described in more detail below with respect to these alternative network architectures to illustrate other devices and instances in which these techniques may be implemented.

In accordance with the automatic resource release techniques described in this disclosure, a first DHCP client device 20A may, upon attempting to access network 14, first request resources, such as an IP address, required for operating within network system 10. DHCP client device 20A may issue a DHCP discover message 24A in an attempt to discover a DHCP server, such as DHCP server 16, in accordance with DHCP. Typically, DHCP client device 20A may broadcast this DHCP discover message 24A throughout subnet 22.

DHCP discovery message 24A may include an L2 network address (e.g., a hardware address) that is globally unique so as to uniquely identify DHCP client 20A. This hardware address may comprise a Media Access Control (MAC) address assigned to a network interface included within DHCP client 20A. In some instances, DHCP discover message 24A may not use a L2 hardware address but may instead include a client identifier, such as a telephone number associated with DHCP client 20A. This client identifier may be provided as another option field within DHCP messages, where this additional option field is commonly referred to as "option 61." Thus, while described herein with respect to a hardware address, the techniques should not be limited in this way, but may be implemented so as to uniquely identify DHCP clients by way of client identifiers rather than L2 network or hardware addresses. In this respect, both the L2 hardware address and the option 61 defined client identifier may each be considered an identifier that uniquely identifies the client device.

DHCP discovery message 24A may further include a field that defines additional context information that uniquely identifies a context in which DHCP client device 20A operates. For example, DHCP discovery message 24A may include a field referred to as "option 60" that defines a Vendor Class Identifier (VCI). DHCP client device 20A may utilize the option 60 field to identify a vendor of hardware or firmware included within DHCP client device 20A. To specify this additional field, DHCP client device 20A may generate DHCP discovery message 24A to include a field having as an identifier the numeral "60," hence the name "option 60," followed by the VCI.

In this sense, option 60 may identify a vendor of DHCP client device 20A and thereby identify a context in which DHCP client device 20A operates. For example, the VCI specified by option 60 of DHCP discover message 24A may identify a vendor of a set-top box (STB) and thereby identify a cable or digital satellite context in which DHCP client device 20A operates.

Regardless, DHCP relay device 12 may receive the DHCP discover message 24A from a DHCP client device 20A that includes the MAC address of DHCP client device 20A and the additional context information. DHCP relay device 12 may update DHCP discover message 24A to add additional context information before forwarding or otherwise relaying DHCP discover message 24A to DHCP server 16. For example, DHCP relay device 12 may modify DHCP discover message 24A to add an additional field referred to as "option 82." DHCP relay device 12 may update or otherwise modify DHCP discover message 24A with the option 82 field to provide additional information to DHCP server 16. DHCP server 16 may utilize the information provided in the option 82 field when assigning the L3 or IP address to the requesting client.

Much like the above mentioned option 60 field, the option 82 filed may be referred to as "option 82" because this field is denoted by the numeral "82" followed by information concerning the relay of DHCP discover message 24A. This relay information may comprise a client identifier or ID assigned by a network service provider to a subscriber that uses DHCP client device 20A or an interface or circuit ID identifying a physical or logical interface of DHCP relay device 12 on which DHCP relay device 12 received the DHCP discover message 24A. A client ID, which may also be referred to as a remote ID, may comprise, for example, a telephone number. In some instances, the circuit ID comprises a Virtual Local Area Network (VLAN) identifier, tag or other metadata assigned to and associated with a DHCP client device. This VLAN tag may uniquely identify a virtual circuit/interface over which DHCP relay device 16 receives traffic from given DHCP client device residing within a particular context. This VLAN tag may be assigned on a per circuit basis not on a per-device basis and thus both of DHCP client devices 20A, 20B may, for example, be assigned the same VLAN tag identifying the same virtual circuit/interface.

While described below with respect to defining a VLAN tag or other circuit ID, the option 82 may include or define a remote ID in conjunction with the VLAN tag or other circuit ID or only define the remote ID. The techniques however should not be limited to VLAN tags or other circuit IDs and may be implemented with a circuit ID, a remote ID, or both a circuit ID and a remote ID.

Both option 60 and option 82 are extensible or, better stated, may be variably defined to include any type of information. For purposes of discussion, additional context information may include information defined by the option 60 field alone, the option 82 field alone or the combination of both the option 60 and 82 fields. Further details with respect to option 82 are described in RFC3046, entitled "DHCP Relay Agent Information Option," M. Patrick, January 2001, the entire contents of which are incorporated herein by reference.

DHCP relay device 12 may, in addition to updating DHCP discover message 24A with option 82, also parse DHCP discover message 24A to determine both the L2 address and the additional context information encoded to the option 60 field included within DHCP discover message 24A. DHCP relay device 12 may maintain one or more internal tables or other data structures, and search these tables to determine whether DHCP client device 20A was previously assigned an IP address or other network resource. It is assumed for purposes of illustration that DHCP client device 20A is either requesting the network resource for a first time or that a lease for previous network resources has expired, and therefore that DHCP relay device 12 maintains no entry for DHCP client device 20A.

As a result, DHCP relay device 12 may create a new entry within at least one of its internal one or more tables and stored within the new entry the MAC address included within DHCP discover message 24A. DHCP relay device 12 may associate the new entry or another entry within another one of the tables with the additional context information. For example, DHCP relay device 12 may associate the new entry with the VCI and interface ID determined from the option 60 and 82 fields, e.g., thereby associating the L2 network address with a vendor context as well as a physical or logical interface of the relay device by which the DHCP discover message was received. After creating these associations, DHCP relay device 12 relays DHCP discover message 24A with the added option 82 field as updated DHCP discover message 26A to DHCP server 16 via links 18 and network 14.

DHCP server 16 may respond to updated DHCP discover message 26A with a DHCP offer message 28A that offers a potential lease of network resources including an L3 IP network address. In this sense, while DHCP discover message 26A may appear to attempt to discover one or more DHCP servers, contrary to the name of the message, DHCP discover message 26A may include additional parameters concerning acceptable terms on which DHCP client device 20A will accept a reservation of network resources. These additional parameters may include a length or duration of the lease of the resources, the types of resources to reserve, and the like. In this respect, DHCP discover message 26A may request network resource for reservation and use by a single DHCP client device 20A within network 14. DHCP server 16 may then, based on these parameters, provide an offer for lease of the requested network resource, e.g., IP address, by way of DHCP offer message 28A. DHCP server 16 may copy or replicate both of the option 60 and option 82 fields from updated DHCP discover message 26A and generate DHCP offer message 28A to include both of these option 60 and option 82 fields.

DHCP relay device 12 intercepts the DHCP offer message 28A, removes the option 82 field from DHCP offer message 28A and relays or otherwise forward this updated DHCP offer message 28 to DHCP client device 20A as updated DHCP offer message 30A. DHCP relay device 12 may utilize this information included within the option 82 field to limit the broadcast or forwarding scope of the updated DHCP offer message 30A. For example, the option 82 field may include circuit or interface information that identifies an interface by which to forward or broadcast updated DHCP offer message 30A. This option 82 field is copied by convention or in accordance with DHCP from the updated DHCP request to the DHCP offer message by DHCP server 16 to facilitate this forwarding by the DHCP relay device.

DHCP client device 20A may receive one or more DHCP offer messages from different DHCP servers similar to DHCP offer message 30A from DHCP server 16. DHCP client device 20A may then select the best one of DHCP offer messages based on the terms of the lease in view of the parameters sent via DHCP discover message 24A. DHCP client device 20A may then issue a DHCP request message 32A to the one of DHCP servers that presented the selected offer requesting the offered lease, which in this instance is assumed to be DHCP server 16 for ease of illustration.

DHCP relay device 12 may forward or otherwise relay DHCP request message 32A to DHCP server 16. DHCP server 16 may then reserve the requested resources, e.g., an offered IP address within the IP address space maintained by DHCP server 16, and responds with a DHCP acknowledge (ACK) message 34A indicating that the requested resources have been reserved for use by DHCP client device 20A within network 14. DHCP relay device 12 may relay or otherwise forward DHCP ACK message 34A to DHCP client device 20A, whereupon DHCP client device 20A, in response to DHCP ACK message 34A, may begin utilizing the reserved resource, e.g., IP address, to access network 14.

Upon receiving either DHCP request message 32A or, more likely, DHCP ACK message 34A, DHCP relay device 12 may parse either of these messages 32A, 34A to determine the network resource DHCP server 16 will or has reserved and updates the one or more tables with the reserved resource. For example, DHCP relay 12 may receive DHCP ACK message 34A indicating that a L3 IP address has been reserved by DHCP server 16 for use by DHCP client device 20A when accessing network 14. DHCP relay device 12 may perform a lookup in the one or more tables using the MAC address included within each and every DHCP message 24-34 to retrieve the entry corresponding to DHCP client device 20A. DHCP relay device 12 may then update the entry to associate the reserved IP address with the MAC address.

DHCP relay device 12 may also update the entry to reflect the length or duration of the lease, as well as, other information pertinent to the lease of the IP address. DHCP relay device 12 may utilize this other lease information for maintenance purposes. For example, DHCP relay device 12 may routinely or periodically traverse the one or more tables to determine whether one or more leases have expired. If a lease has expired or timed-out, DHCP relay device 12 may remove the expired lease entry from the table. DHCP server 16 may also maintain substantially similar tables to that of DHCP relay device 12 and may, like DHCP relay device 12, utilize this information for maintenance purposes. In this respect, DHCP relay device 12 may mirror the lease information stored by DHCP server 16.

In any event, DHCP client device 20A may utilize the reserved IP address when accessing network 14. The dynamic host configuration protocol however does not mandate that leases for IP addresses or any other network resource be released when the reserving device has finished using the network resource. DHCP does not require this release because network devices may suddenly fail or become unconnected from the network and be unable to communicate the release of the reserved network resource. To compensate for this deficiency, DHCP utilizes the above described leases to limit the amount of time a given DHCP client device may reserve a particular network resource, such as an IP address. Thus, even if a device fails to release an IP address, for example, eventually the lease will timeout and the DHCP server that reserved the IP address may automatically release the IP address. DHCP client devices may renew a lease if still using the network resource, but if failed or unable to communicate, the DHCP client device may be unable to communicate this DHCP renew message (which may comprise a DHCP request message that includes options indicating that the DHCP client device requests renewal of the lease for the reserved IP address) and the lease will timeout causing the DHCP server to automatically release the lease.

While providing adequate protection against inefficient use of resources, the Internet has grown and with it the total number of devices that access the Internet and a 32-bit IP address may not be sufficient to uniquely identify each device that desires access to the Internet. In this sense, the IP address space has tightened and even small inefficiencies, such as reserved but not used IP addresses, may limit access to the Internet, such as network 14.

For example, DHCP client device 20A may fail without issuing a DHCP release message, e.g., a DHCP message requesting release of the lease reserving an IP address for use by DHCP client device 20A, to DHCP server 16 releasing the lease of the above IP address. The subscriber utilizing DHCP client device 20A to access network 14 may request a new DHCP client device 20B as a replacement for failed DHCP client device 20A. DHCP client device 20A may in this context be considered a replaced DHCP client device 20A. The subscriber or other user may, upon receiving this DHCP client device 20B, swap DHCP client device 20A for DHCP client device 20B, as shown by the arrow labeled "SWAP" in FIG. 1. DHCP client device 20B is shown in dashed lines to represent later swap of DHCP client device 20A for DHCP client device 20B.

DHCP client device 20B, upon being powered up, activated, or otherwise enabled to operate, may attempt to connect to network 14. In order to communicate with or otherwise access network 14, DHCP client device 20B, similar to DHCP client device 20A, may generate and broadcast a DHCP discover message 24B throughout subnet 22. DHCP client device 20B may generate this DHCP discover message 24B to include both a hardware address assigned to hardware within DHCP client device 20B and an option 60 field that specifies, at least in part, the additional context information. Notably, the hardware address assigned to hardware within DHCP client device 20B is different from the hardware address assigned to hardware within DHCP client device 20A and included within first DHCP discover message 24A. In this respect, the hardware address of DHCP discover message 24A represents a first hardware address and the hardware address of DHCP discover message 24B represents a second hardware address different from the first hardware address.

DHCP relay device 12 may receive DHCP discover message 24B and update this DHCP discover message 24B to include the option 82 field, e.g., interface ID which in some instances may comprise the above VLAN tag. As DHCP client device 20B replaced DHCP client device 20A, the interface ID or, in some instances, VLAN tag, specified within the option 82 field of the updated version of DHCP discover message 26B may be the same as the interface ID, or VLAN tag, specified within the option 82 field of the updated DHCP discover message 26A, as DHCP client device 20B replaced DHCP client device 20A. Moreover, often the option 60 fields of both DHCP discover messages 24A and 24B specifies the same VCI or may specify different but related VCI's. In any event, DHCP discover message 26B may include a different hardware or MAC address but the same, related, or similar additional context information that identifies the same context in which replaced DHCP client device 20A operated.

DHCP relay device 12 may then perform a lookup on the L2 network address (e.g., MAC hardware address) included within DHCP discover message 24B in the one or more tables to find an entry corresponding to the MAC address. Assuming DHCP client device 20B did not previously operate within subnet 22, DHCP relay device 12 may not locate any entries corresponding to the MAC address of DHCP client device 20B. DHCP relay device 12 may, in response to not finding an entry based on this MAC address, perform a failsafe or additional lookup using the additional context information, e.g., the vendor context from option 60 field as set by the client device as well as the interface context, e.g., the VLAN tag, of option 82 field as may be set by the DHCP relay device. As the additional context information is the same for both the updated version of DHCP discover message 26B, e.g., DHCP discover message 24B updated with the option 82 field, and updated DHCP discover message 26A, DHCP relay device 12 may determine that DHCP client device 20B has replaced DHCP client device 20A, as the MAC addresses are different but the additional context information that identifies the context in which DHCP client devices 20 operate is the same, related or similar.

Assuming that DHCP client device 20A did not fail gracefully, e.g., by issuing a DHCP release message to release the IP address, or that the lease did not expire, DHCP relay device 12 may retrieve an entry based on the additional context information, e.g., the vendor context with respect to the vendor that provided the client device (as specified in option 60 field) in combination with the interface context (as specified in the option 82 field), which for example may comprise the VLAN tag that identifies a logical interface over which DHCP relay device 12 receives traffic from client devices in that particular context. In response to finding this entry, DHCP relay device 12 may then issue a DHCP release message 36 requesting that DHCP server 16 release the IP address originally associated with the additional context as indicated by the entry. DHCP relay device 12 may also remove or release the IP address within its mirrored one or more tables. In this respect, DHCP relay device 12 may release network resources, e.g., a first IP address, reserved for use by DHCP client device 20A within network 14 based on the determination that the additional information within first updated DHCP discover message 26A and the second updated version of DHCP discover message 26B is the same, related or similar. DHCP server 16 may then, in response to DHCP release message 36, release the IP address indicated within DHCP release message 36.

DHCP client device 20B may then, after a short time duration without receiving any response to its first DHCP discover message 24B, broadcast or issue another DHCP discover message 24C in accordance with DHCP. DHCP relay device 12 may be configured not to forward or relay DHCP discover message 24B in order to give DHCP server 16 time to process the previously sent DHCP release message 36 so as to release the IP address indicated by DHCP release message 36, causing DHCP client device 20B to issue another DHCP discover message. DHCP relay device 12 may then receive and update DHCP discover message 24C to include the option 82 field, perform the lookup, and determine that no entry corresponds to either the MAC address or the additional context information, e.g., identified by the option 60 and 82 fields. DHCP relay device 12 may relay this updated version of DHCP discover message 24C to DHCP server 16 as updated DHCP discover message 26B.

Upon receiving updated DHCP discover message 26B, DHCP server 16 may generate a DHCP offer message 28B that offers a potential lease for network resources to DHCP client device 20B. DHCP offer message 28B may include both of the option 60 and 82 fields, which are copied from updated DHCP discover message 26B. DHCP relay device 12 may receive DHCP offer message 28B and remove the option 82 field from DHCP offer message 28B before forwarding this updated DHCP offer message 28B to DHCP client device as updated DHCP offer message 30B. As described above, DHCP client device 20B may receive multiple DHCP offer messages from different DHCP servers and select one of the leases offered by these DHCP servers.

DHCP client device 20B, for purposes of illustration, is assumed to select the lease offered by updated DHCP offer message 30B and issues a DHCP request message 32B to DHCP server 16 requesting the offered lease, which DHCP relay device 12 relays to DHCP server 16. DHCP server 16 may receive DHCP request message 32B and reserve the requested resource, e.g., the offered IP address within the IP address space maintained by DHCP server 16. DHCP server 16, assuming successful reservation of the requested network resource, issues a DHCP ACK message 34B back to DHCP client device 20B, which DHCP relay device 12 relays to DHCP client device 20B. DHCP relay device 12 may also update its one or more mirrored tables to associate the reserved network resource, e.g., IP address, with the hardware address and the additional context information. DHCP client device 20B may then utilize the reserved network resources to access network 14.

In this manner, DHCP relay device 12 may automatically release network resources upon determining that a DHCP client device, such as DHCP client device 20A, did not fail gracefully. In other words, DHCP relay device 12 may automatically, e.g., without any user input or oversight, generate and issue an entire DHCP release message, and not just update a portion of a release message, on behalf of a DHCP client device that did not fail gracefully to release a lease of resources reserved for the failing device. DHCP relay device 12 may, by automatically releasing these network resources, improve re-use of network resources, and thereby improve access to network 14, especially in instances where the address space may be tight or otherwise limited.

While described above as implemented by DHCP relay device 12, DHCP server 12, may in some instances, implement the techniques. For example, DHCP server 12 may implement the techniques in instances where DHCP relay device 12 does not implement the techniques. In this instance, DHCP relay device 12 may update the messages as described above, but may not store or maintain the additional tables to include the additional context information. However, DHCP server 12 may implement the techniques to store these tables that include the additional context information. This embodiment where DHCP server 12 implements the techniques described herein is describe below in more detail with respect to FIG. 4.

Figure 2:
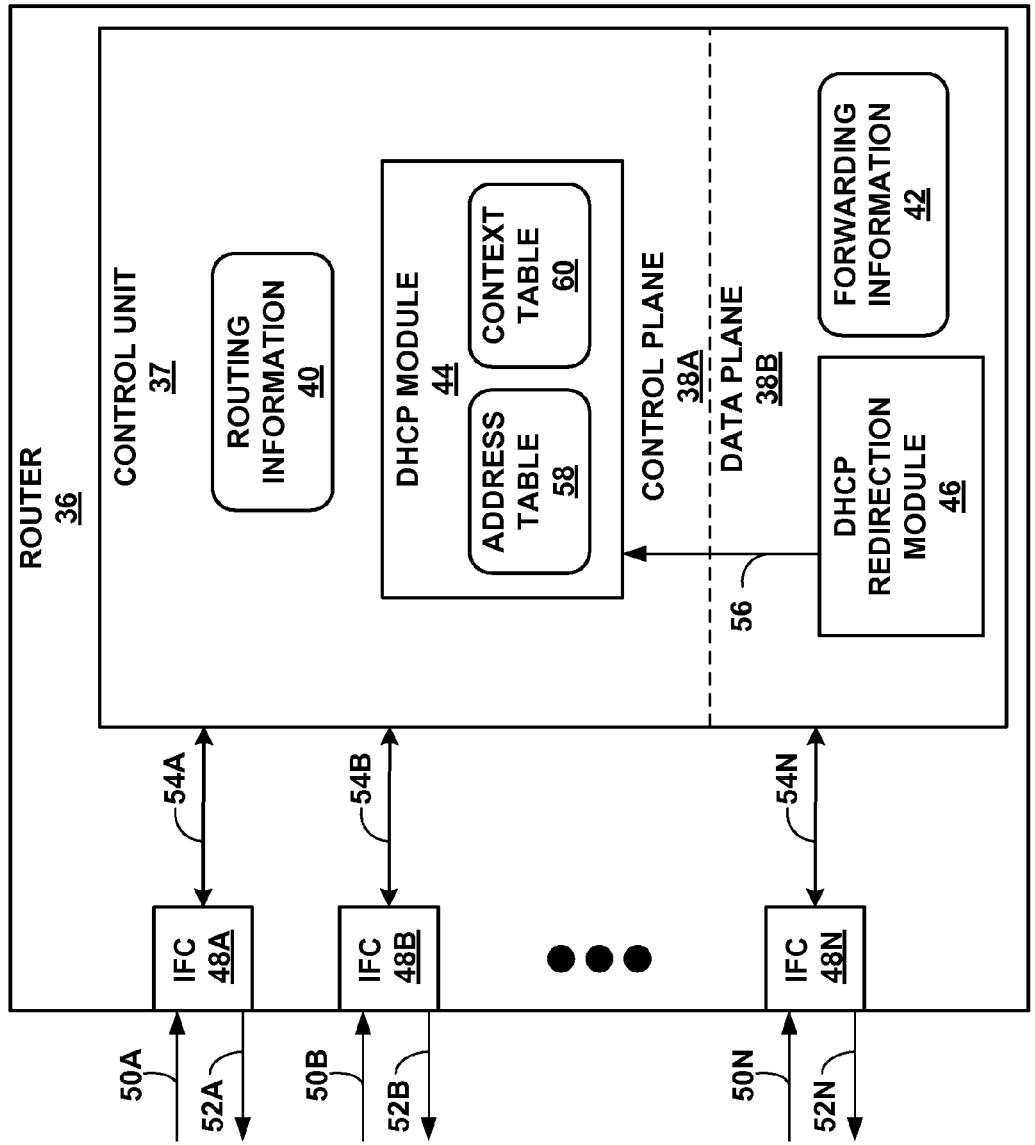
FIG. 2 is a block diagram illustrating an example embodiment of a router that implements the automatic resource release techniques described herein.

FIG. 2 is a block diagram illustrating an example embodiment of a router 36 that implements the automatic resource release techniques described herein. Router 36 may represent any network device that that performs routing functions to route data units through a network. Router 36 may route particular types of data units referred to as packets and as a result may be referred to as a "packet-based router." Moreover, router 36 may implement layer 3 (L3) protocols or network layer protocols (where L3 refers to the L3 of the OSI model, as described above), such as an Internet Protocol (IP), and route packets according to layer 3 information. Consequently, router 36 may also be referred to as a "layer 3 router", a "network layer router" or an "IP router." Moreover, router 36 may represent an example embodiment of DHCP relay device 12 of FIG. 1. For purposes of illustration, router 36 may be described below within the context of exemplary network system 10 of FIG. 1.

As shown in FIG. 2, router 36 includes a control unit 37. Control unit 37 may comprise one or more processors (not shown in FIG. 2) that execute software instructions, such as those used to define a software or computer program, stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 37 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 37 may be divided into two logical or physical "planes" to include a first control or routing plane 38A and a second data or forwarding plane 38B. That is, control unit 37 may implement two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 38A of control unit 37 may execute the routing functionality of router 36. In this respect, control plane 38A may represent hardware and/or software of control unit 37 that implements routing protocols (not shown in FIG. 2) by which routing information 40 may be determined. Routing information 40 may include information defining a topology of a network, such as network 14. Control plane 38A may resolve the topology defined by routing information 40 to select or determine one or more routes through network 14. Control plane 38A may then update data plane 38B with these routes, where data plane 38B maintains these routes as forwarding information 42. Forwarding or data plane 38B may represent hardware and/or software of control unit 37 that forwards network traffic in accordance with forwarding information 42.

Control plane 38A may further comprise a DHCP module 44 that implements DHCP in the manner described above with respect to DHCP relay device 12 of FIG. 1. In other words, DHCP module 44 may receive DHCP messages, such as DHCP messages 24-34, and relay these messages to a DHCP server, such as DHCP server 16. In some instances, DHCP relay device 12 may update one or more of the received DHCP messages to either add additional context information, e.g., the option 82 field, or remove this additional context information. More information concerning DHCP in general as well as particulars concerning DHCP messages, such as DHCP discover, offer, request, release, renew, acknowledge and other messages can be found in Request for Comments (RFC) 2131, titled "Dynamic Host Configuration Protocol," dated March 1997, herein incorporated by reference in its entirety.

Data plane 38B may also comprise a DHCP redirection module 46. DHCP redirection module 46 may represent a software and/or hardware module that inspects incoming network traffic to determine if this incoming network traffic represents DHCP messages. DHCP redirection module 46 may, in some instances, comprise a logic programmed within a forwarding ASIC or other component of data plane 38B that filters traffic based on headers of the incoming network traffic or any other similar mechanism that data plane 38B may employ to distinguish particular types of network traffic from other types of network traffic.

DHCP redirection module 46 may for example comprise one or more filters programmed within data plane 38B that listens on a one or more ports assigned for DHCP communications, e.g., ports 67 and 68. DHCP redirection module 48 may comprise one filter that listens on these DHCP ports 67 and 68, and upon receiving traffic over these ports, DHCP redirection module 48 may determine an address to which the DHCP communications are transmitted. DHCP clients 20 may, for example, transmit the DHCP messages by broadcasting these DHCP messages over one of the above ports. DHCP redirection module 48 may, therefore, filter packets that indicate a broadcast address, e.g., an address of zero, and designate one of the DHCP ports. DHCP messages from server 16 may specify particular interfaces of router 36 by address and also designate one of the above DHCP ports. DHCP redirection module 46 may likewise filter DHCP messages that include one of the interface addresses and one of the DHCP ports. DHCP redirection module 46 may therefore filter packets in this manner and forward DHCP messages 56 to control unit 37.

As further shown in FIG. 2, router 36 includes Interface Cards (IFCs) 48A-48N ("IFCs 48") that receive and send packet flows or network traffic via inbound network links 50A-50N ("inbound network links 50") and outbound network links 52A-52N ("outbound network links 52"), respectively. IFCs 48 are typically coupled to network links 50, 52 via a number of interface ports (not shown), and forward and receive packets and control information from control unit 37 via a respective one of paths 54A-54N ("paths 54"). Each physical interface of IFCs 48 is typically assigned a unique identifier by control unit 37, and multiple logical interfaces having unique identifiers may be assigned to each physical interface, where each logical interface represents as a distinct input or output interface for different network traffic. These logical interfaces may represent VLANs and each VLAN may be assigned a unique VLAN tag. Often, each particular context in which a DHCP client devices resides is assigned a VLAN tag to differentiate between client devices of different context. Each of IFCs 48 may also each couple to a different separate sub-network via links 50, 52. These sub-networks, although not shown in FIGS. 1 and 2, may comprise a Large Area Network (LAN) or other broadcast network.

Router 36 may include a chassis (not shown in FIG. 2) having a number of slots for receiving a set of cards, including IFCs 48. Each card may be inserted into a corresponding slot of a chassis for communicably coupling the card to a control unit 36 via a bus, backplane, or other electrical communication mechanism.

Initially, router 36 may receive network traffic via inbound network links 50 from a DHCP client device, such as DHCP client device 20A. In particular, IFCs 48 coupled to respective inbound network links 76 may receive the network traffic, whereby each of IFCs 48 forward the network traffic to data plane 38B. DHCP redirection module 46 may then filter or otherwise perform operations to determine whether the incoming network traffic includes DHCP messages, such as DHCP messages 24-34. DHCP redirection module 46 may inspect the incoming network traffic and identify DHCP messages based on the format of DHCP messages, as set out in detail in the above incorporated RFC 2131. DHCP redirection module 46, upon detecting one or more DHCP message within the incoming network traffic, may forward either the DHCP message or a copy of the DHCP message to DHCP module 44, which is shown in FIG. 2 as DHCP messages 56.

As described above with respect to FIG. 1, router 36 may first receive a DHCP discover message, such as DHCP discover message 24A, that includes the option 60 field from a first DHCP client device 20A, where the DHCP discover message is received over a particular physical interface and optionally over a logical interface associated with the physical interface. DHCP redirection module 46 may detect or filter this message 24A and forward message 24A to DHCP module 44 as one of DHCP messages 56. DHCP redirection module 46 may not forward a copy or replica of this message 24A, as DHCP module 44 may update message 24A with the option 82 field. In this respect, for messages 56 to which DHCP module 44 adds additional information or updates, DHCP redirection module 46 may forward the actual message and not a replica or copy of the message. In some instances, DHCP redirection module 46 may forward metadata, e.g., in the form of a tag appended to the message, indicating an interface ID that identifies the logical and/or physical interface of one of IFCs 48 over which the message was received.

In any event, DHCP module 44 may update message 24A with the option 82 field so as to carry additional context information in the form of circuit context data. For example, DHCP module 44 may update option 82 field to include circuit context data to encode relay agent local identification of the circuit (e.g. physical or logical interface number or vlan identifier) on which the DHCP packet was received. Further, option 82 field may already contain additional information specified by the particular client device with respect to the circuit, such as data encoding the remote host end of the circuit (e.g. a caller ID telephone number or a modem ID of a cable modem). The collective data stored in option 82 field after updating by DHCP module 44 of the relay agent (router 36 in this example), including the relay agent local identification of the circuit, is referred to herein as the circuit context information. In instances where metadata is appended to message 24A, DHCP module 44 may insert the information, e.g., interface ID or relay information, specified by the tag or metadata into the updated option 82 field. In some cases, DHCP module 44 may determine the information to be stored to the option 82 field based at least in part on routing information 40 and an L2 address or other information parsed form DHCP messages 56.

DHCP module 44 may next parse DHCP discover message 24A to determine a hardware address included within message 24A. DHCP module 44 may include and maintain an address table 58 that includes address entries that map L2 hardware addresses to L3 IP addresses or other network resources. DHCP module 44 may use the parsed hardware address from message 24A to perform a lookup in address table 58 for an address entry associated with the parsed hardware address.

Assuming no entry exists in address table 58 that is associated with the parsed hardware address, DHCP module 44 may parse the additional context information specified in either or both of the option 60 and 82 fields. DHCP module 44 may further include and maintain a context table 60 that includes one or more context entries, each of which associates context information with an IP address or other network resources. That is, the entries of the context table 60 can be indexed by vendor context in combination with circuit context so as to retrieve an associated L3 IP address. While shown as separate tables 58 and 60 in FIG. 2, DHCP module 44 may maintain these tables within a single table data structure having two indexes with a first index associating hardware addresses to entries and a second index associating context information (e.g., vendor context in combination with circuit context) to entries. In this way, both of tables 58, 60 may reside within a single table having entries that each store a different L2 hardware address, context information and L3 IP addresses.

Regardless of the structure of tables 58 and 60, when no entry exists for the hardware address, DHCP module 44 may perform a second lookup using the context information parsed from message 24A as a key. Assuming no entry exists in either of tables 58 and 60, DHCP module 44 may create an entry in each of tables 58 and 60, with the new entry of table 58 specifying the parsed hardware address and the new entry of table 60 specifying the parsed context information (e.g., the combination of vendor context and the circuit context or a hash of a combination thereof). DHCP module 44 may then forward message 24A back to data plane 38B, which proceeds to forward message 24A in accordance with forwarding information 42 as updated DHCP discover message 26A. Particularly, data plane 38B may forward updated DHCP discover message 26A via a one of IFCs 48 indicated in forwarding information 42.

After forwarding updated DHCP discover message 26A, DHCP redirection module 46 may detect a DHCP offer message 28A when filtering incoming network traffic arriving via inbound network links 50. DHCP redirection module 46 may forward this message to DHCP module 44 as DHCP messages 56, whereupon DHCP module 44 may remove the option 82 field and forward the message back to data plane 38B. Data plane 38B may then forward this message as updated DHCP offer message 30A back to DHCP client device 20A via one of the logical and/or physical interfaces associated with IFCs 48 as indicated by forwarding information 42.

DHCP redirection module 46 may, after forwarding updated DHCP offer message 30A, detect a DHCP request message 32A and forward this message up to DHCP module 44 so that additional context information, e.g., by way of the option 82 field, can be added to this message. Thus, while not shown in FIG. 1 as including updated offer message and updated DHCP ACK messages, DHCP module 44 may update this message to add and remove the additional context information from these messages. These additional messages are not shown in FIG. 1 for ease of illustration purposes. DHCP module 44 may also, in some instances, update address table 58 and context table 60 with the requested IP address, as described in more detail below. DHCP module 44 may then forward message 30A back to data plane 38B, which may forward this message 32A in the manner described above.

DHCP redirection module 46, after data plane 38B forwarded DHCP request message 32A, detect a DHCP ACK message 34A within incoming network traffic. DHCP redirection module 46 may, in some instances, forward DHCP ACK message 34A to DHCP module 44 so that DHCP module 44 may update address table 58 and context table 60 with the IP address reserved for use within network 14 by DHCP client device 20A. DHCP module 44 may parse the hardware address from DHCP ACK message 34A and perform a lookup of address table 58 using the parsed hardware address to retrieve the entry previously associated with the hardware address. DHCP module 44 may then update the associated entry with the reserved network resource, e.g., IP address.

DHCP module 44 may likewise parse additional context information from DHCP ACK message 34A and perform a lookup to retrieve an entry associated with the parsed context information within context table 60. DHCP module 44 may then update this entry with the reserved network resources, e.g., IP address. Alternatively, DHCP module 44 in the single table instance may only perform the lookup once based on the parsed hardware address and update the single entry. After updating tables 58 and 60, DHCP module 44 may forward DHCP ACK message 34A back to data plane 38B, which forwards message 34A in the manner described above.

Assuming for purposes of illustration that DHCP client device 20A fails without releasing the above reserved IP address (or, in other words, does not fail gracefully) and is replaced by DHCP client device 20B, DHCP module 44 may receive a DHCP discover message 24B from DHCP client device 20B. DHCP redirection module 46 may intercept this message 24B and forward this message 24B to DHCP module 44 as one of DHCP messages 56. DHCP module 44 may update this message 24B with the above described option 82 field to generate an updated DHCP discover message 26B. Updated DHCP discover message 26B may include both an option 60 field specifying a VCI and an option 82 field specifying circuit context information as installed by router 36 (e.g., interface context for the discover message) and optionally any data installed by the DHCP client at the remote host-end of the circuit. In this respect, DHCP discover message 26B may define additional context information that identifies the same context as that identified by DHCP discover message 24B received from now replaced DHCP client device 20A. For example, router 36 will likely receive both DHCP messages 24B, 26B over the same circuit (e.g., vlan or logical/physical interface), any information installed by the remove client (e.g., caller ID telephone number) as well as vendor context information (e.g., data identifying the vendor) will likely be the same.

DHCP module 44 may parse either DHCP discover message 24B or updated DHCP discover message 26B to determine a hardware address, e.g., MAC address, specified by one of these messages. Based on the parsed hardware address, DHCP module 44 may perform a lookup of address table 58 to retrieve an entry associated with the parsed hardware address. DHCP module 44, considering that DHCP client device 20B has not previously accessed network 14 or reserved any network resources, may not retrieve an entry from address table 58. DHCP module 44 may, as a result, create a new entry within address table 58 and associate the new entry with the parsed hardware address.

DHCP module 44 may, upon failing to retrieve an entry associated with the parsed hardware address within address table 58, parse updated DHCP discover message 26B to determine the additional context information, e.g., the information stored to the option 60 and 82 fields. Based on the parsed additional context information, DHCP module 44 may perform a lookup of context table 60 to retrieve a context entry. Considering that the additional context information of DHCP discover message 24B is the same as the additional context information of DHCP discover message 24A, DHCP module 44 may retrieve a context entry associated with the parsed additional context information.

In response to this context entry, DHCP module 44 may determine that DHCP client device 20A has failed without releasing the IP address reserved for DHCP client device 20A. DHCP module 44 may, as a result of this determination, automatically, e.g., without user or administrator intervention, generate a DHCP release message 36 on behalf of client device 20A. DHCP release message 36 may request or otherwise cause DHCP server 16 to release the IP address reserved for use by DHCP client device 20A. DHCP module 44 may forward this message 36 to data plane 38B, which proceeds to forward DHCP release message 36 in the manner described above to DHCP server 16.

DHCP module 44 may then update address table 58 so as to remove the address entry corresponding to the released IP address from address table 58. In this respect DHCP module 44 may automatically release, on behalf of a DHCP client device that did not fail gracefully, an IP address or other network resource reserved for use by the failed DHCP client device. By performing this automatic resource release, DHCP module 44 may improve network performance and otherwise promote efficient network operation.

DHCP module 44 may also not update and forward DHCP discover message 24B from DHCP client device 20B in order to provide DHCP server 16 with sufficient time to release the IP address and/or other network resources reserved for use by DHCP client device 20A. DHCP module 44, again by way of DHCP redirection module 46, receive another DHCP discover message 24C in accordance with DHCP from replacement DHCP client device 20B. DHCP module 44 may update DHCP discover message 24C with the option 82 field and forward this message back to data plane 38B, which may forward updated DHCP discover message 26B in the manner described above. DHCP module 44 may proceed to receive a DHCP offer message 28B, update this message by removing the option 82 field, and forward updated DHCP offer message 30B. DHCP module 44 may receive, after forwarding updated DHCP offer message 30B, a DHCP request message 32B and update and forward this message 32B. In some instances, DHCP module 44 may, after forwarding DHCP request message 32B, update address table 58 and context table 60, as described above, to associate address and context entries with the requested IP address.

After forwarding DHCP request message 32B, DHCP module 44 may receive a DHCP ACK message 34B acknowledging the reservation of the IP address for use by DHCP discover message 20B. DHCP module 44 may, in some instances, update an address entry and context entry within respective tables 58, 60 to reflect the reservation of the IP address by server 16. In this manner, DHCP module 44 may maintain tables 58 and 60 to mirror similar tables maintained by server 16. DHCP module 44 may continue to implement the automatic resource release techniques to correct any inefficiencies resulting from the graceless failure of DHCP client devices, such as DHCP client device 20A.

Figure 3:
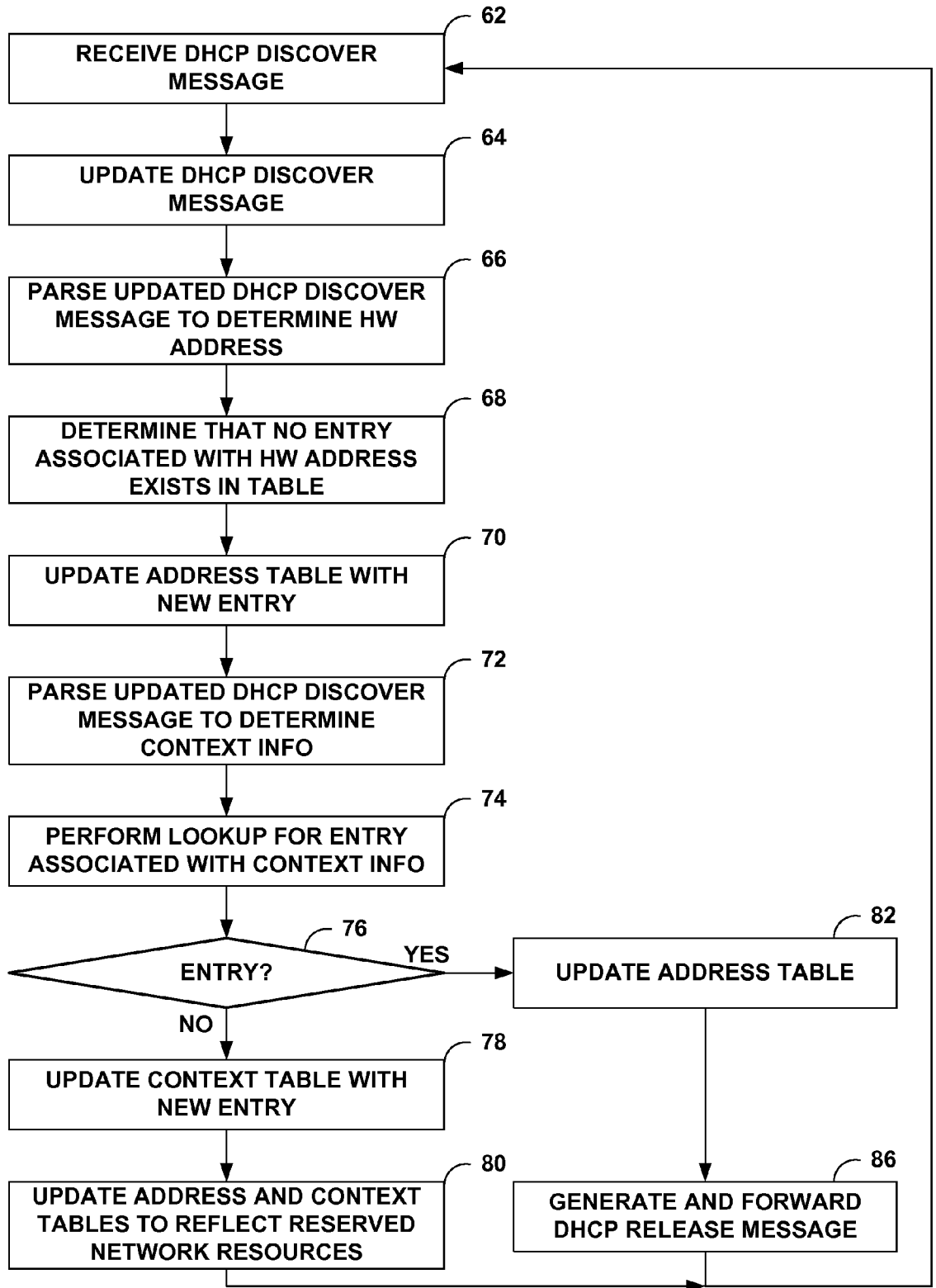
FIG. 3 is a flowchart illustrating exemplary operation of a network device in performing the techniques of the invention.

FIG. 3 is a flowchart illustrating exemplary operation of a network device, such as router 36 of FIG. 2, in performing the techniques of the invention. While described with respect to a particular network device, e.g., router 36, the techniques may be implemented by any network device capable of relaying, either transparently or otherwise, messages related to reservation of network resources or actual reservation of network resources, as described below in more detail.

Initially, router 36 receives a DHCP discover message, such as DHCP discover message 24A shown in FIG. 1 (62). DHCP redirection module 46 may intercept DHCP discover message 24A by filtering incoming network traffic received via inbound network links 50 and respective IFCs 48. DHCP redirection module 46 may forward intercepted DHCP discover message 24A as one of DHCP messages 56 to DHCP module 44. DHCP module 44 may update DHCP discover message 24A in the manner described above to generate updated DHCP discover message 26A (64). DHCP module 44 may parse updated DHCP discover message 26A (or DHCP discover message 24A) to determine a hardware (HW) address, such as a MAC address assigned to hardware included within DHCP client device 20A (66).

Using this parsed HW address as a key into address table 58, DHCP module 44 may perform a lookup to determine that none of the addresses entries of address table 58 correspond to the parsed hardware address (68). No entries correspond to the parsed hardware address because it is assumed for purposes of illustration that DHCP client device 20A has not previously operated within network system 10 or that a prior lease of network resources has expired. If DHCP client device 20A had previously request a network resource, DHCP client device 20A upon restarting or otherwise rebooting may issue a DHCP request message requesting the IP address again.

Continuing under the assumption that DHCP client device 20A has no ongoing reservation of a network resource, DHCP module 44 may update address table 58 to create a new entry within address table 58 and associate this new entry with the parsed hardware address (70). DHCP module 44 may then parse updated DHCP discover message 26A to determine the above described additional context information identifying a context in which DHCP client device 20A operates (72). DHCP module 44 may use the parsed additional context information as a key when performing a lookup on context table 60 to determine whether any of the entries of context table 60 correspond to the parsed context information (74). If no entry is found ("NO" 76), DHCP module 44 may update context table 60 with a new entry and associate this new entry with the parsed context information (78).

DHCP module 44 may then forward updated DHCP discover message 26A to data plane 38B, which proceeds to forward updated DHCP discover message 26A in the manner described above. DHCP module 44 may then, as described above, successively receive a DHCP offer message 28A, a DHCP request message 32A and a DHCP ACK message 34A, each of which are sent to reserve an IP address and/or other network resources for use by DHCP client device 20A. In response to one or more of the above messages 28A-34A, DHCP module 44 may update address and context tables 58, 60 to reflect the reservation of an IP address and/or other network resources for use by DHCP client device 20A (80). DHCP module 44 may update these tables 58 and 60 in the manner described above to associate one or more entries of these tables with the reserved IP address and/or other network resources.

As described above, it is assumed for purposes of illustration that DHCP client device 20A fails without releasing the reserved IP address and/or other network and is replaced or swapped for DHCP client device 20B. DHCP client device 20B may then issue a DHCP discover message 24B, which DHCP module 44 receives in the manner described above (62). DHCP module 44 may update DHCP discover message 24B with the option 82 field and parse this updated DHCP discover message to determine the hardware (HW) address included within the updated DHCP discover message (64, 66). DHCP module 44 may perform a lookup using the parsed hardware address only to determine that no entry associated with the parsed hardware address exists in address table 58 for the above described reasons (68). DHCP module 44 may update address table 58 with a new entry and associate the new entry with the parsed hardware address (70).

However, rather than immediately relay updated this DHCP discover message upon failing to find such an entry, DHCP module 44 may parse this updated DHCP discover message to determine the additional context information (72). Notably, as DHCP client device 20B has replaced DHCP client device 20A, DHCP client device 20B operates in the same context as that in which DHCP client device 20A operated. In this respect, the additional context information parsed from this updated DHCP discover message received from DHCP client device 20B is the same, similar or at least related enough to the additional context information of updated DHCP discover message 26A so as to enable DHCP module 44 to determine that DHCP client device 20A failed without releasing the IP address reserved for use by DHCP client device 20A.

To illustrate, DHCP module 44 may perform a lookup for a context entry of context table 60 that is associated with the parsed context information (74). Considering that this information may be the same as the context information included within updated DHCP discover message 24A, DHCP module 44 may retrieve the entry previously created in response to DHCP discover message 24A and associated with the context information parsed from DHCP discover message 24A ("YES" 76). Upon retrieving this entry, DHCP module 44 may determine that DHCP client device 20A did not fail gracefully and that an IP address may still be reserved by DHCP server 16 for use by DHCP client device 20A.

DHCP module 44 may, in some instances, verify that the lease reserving the IP address for use by DHCP client device 20A has not expired by accessing address table 58 using the reserved IP address. If not active, DHCP module 44 may forward the updated DHCP discover message similar to updated DHCP discover message 26A, whereby DHCP client 20B, router 36 and DHCP server 16 may proceed similar to that discussed above with respect to reserving an IP address for DHCP client device 20A.

However, for purposes of illustration, it is assumed the lease still exists, and DHCP module 44 may update address table 86 in the manner described above to remove the entry associated with the released IP address (82). DHCP module 44 may then generate and forward a DHCP release message 36, as described above (86). In this way, router 36 may act on behalf of a client device that failed without gracefully releasing network resources reserved for use by the failed client to gracefully release the network resources reserved for use by non-operational client devices.

Figure 4:
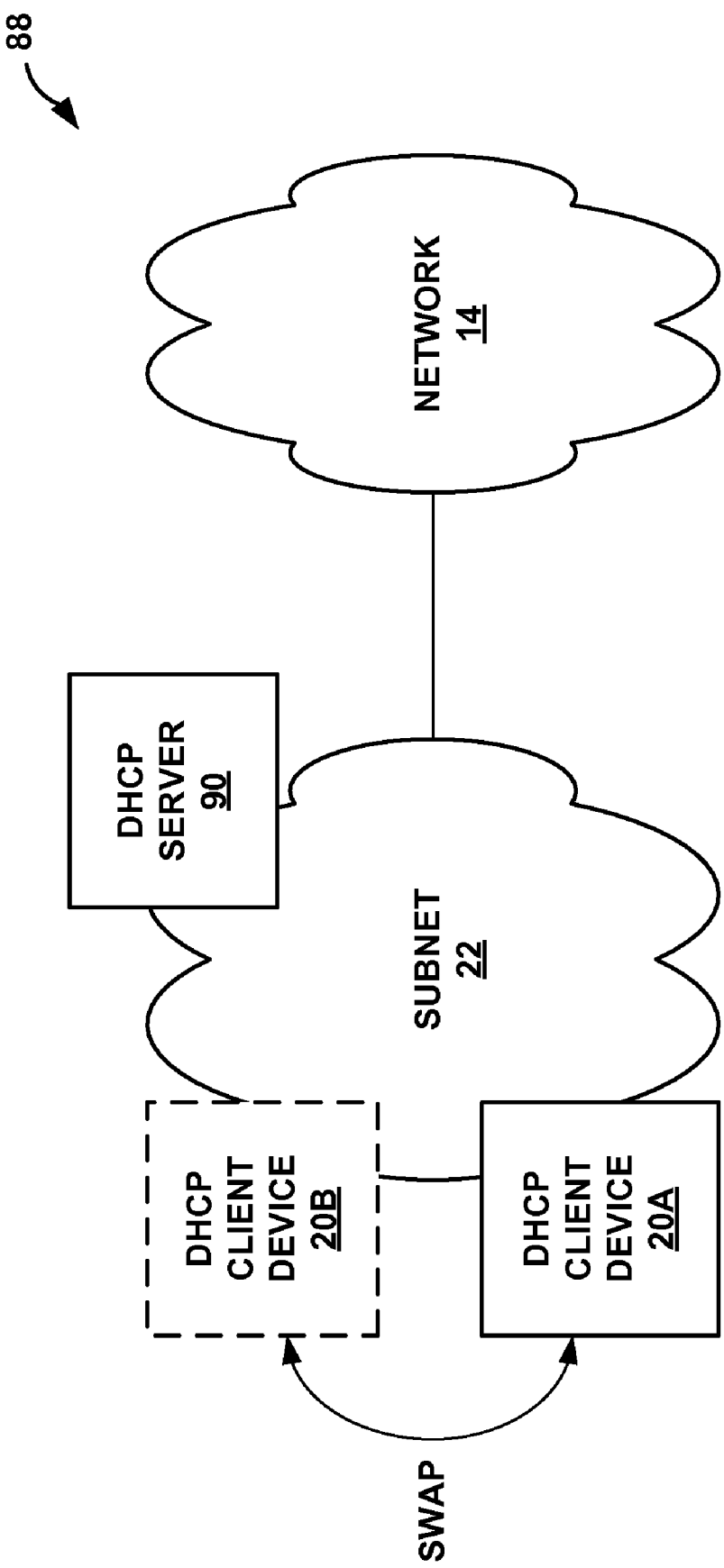
FIG. 4 is a block diagram illustrating another exemplary network system in which a DHCP server implements the techniques described herein to automatically release network resources.

FIG. 4 is a block diagram illustrating another exemplary network system 88 in which a DHCP server 90 implements the techniques described herein to automatically release network resources. Network system 88 may be similar to network system 10 of FIG. 1 in that both of systems 10 and 88 include a network 14, DHCP client devices 20A, 20B and a subnet 22. However, network system 88 does not include a DHCP relay device 12, as DHCP server 90 in the example of FIG. 4 resides in the same subnet, e.g., subnet 22, as DHCP client devices 20. DHCP server 90 may be substantially similar to DHCP server 16 of FIG. 1, except that DHCP server 90 may implement the techniques described herein.

While assumed for purposes of example not to include a DHCP relay device, this is not a precondition or requirement for DHCP server 90 to implement the techniques described herein. As described above, DHCP server 90 may implement the techniques in instances where a DHCP relay device 12 is positioned between the DHCP client and DHCP server 90. For example, DHCP relay device 12 may not implement the techniques described herein and, in these instances, DHCP server 90 may implement the techniques, as described in more detail below, to automatically release resources associated with a given DHCP client device. The techniques therefore should not be limited to the exemplary embodiments described herein.

As described above, DHCP requires that either a DHCP server or a DHCP relay device reside in the same subnet as the DHCP clients. As shown in FIG. 4, subnet 22 includes DHCP server 90 and thus need not include a DHCP relay device, such as DHCP relay device 12. In this respect, DHCP client device 20A may issue a DHCP discover message, such as DHCP discover message 24A, directly, e.g., without a DHCP relay device intercepting and relaying the message, to DHCP server 16. DHCP client device 20A may generate and transmit DHCP discover message 24A with the additional context information stored to the option 60 field, as described above. In some instances, DHCP client device 20A may directly generate updated DHCP discover message 26A or in other words generate a DHCP discover message to include the additional context information stored to both the option 60 and option 82 fields.

In still other instances, DHCP client device 20A may generate DHCP discover message 24A with the additional context information stored to the option 60 field and forward DHCP discover message 24A to DHCP server 16. An intermediate network device, such as a Digital Subscriber Line Access Multiplexor (DSLAM) providing network access, may, when forwarding DHCP discover message 24A, update DHCP discover message 24A to add additional context information, often in the form of an option 82 field including additional circuit context data specific to the circuit by which the DSLAM received the request. This DSLAM or other intermediate network device may not be considered a DHCP relay device, as the DSLAM may not route or otherwise direct the DHCP messages to particular DHCP servers, but instead merely update particular messages to facilitate service of DHCP messages.

Regardless, DHCP server 90 may receive a DHCP discover message from DHCP client device 20A that includes additional context information stored to an option 60 field, an option 82 field or a combination thereof. DHCP server 90 may respond with a DHCP offer message offering a lease of an IP address and/or other network resources. DHCP client device 20A may, in response to the DHCP offer message, issue a DHCP request message in order to reserve the offered lease of the IP address. DHCP server 90, as described above, may respond to the DHCP request message with a DHCP ACK message that acknowledge the request for the lease.

DHCP server 90, similar to DHCP relay device 12, may maintain one or more tables in which to record the lease for the IP address. As described above, DHCP relay device 12 maintained these one or more tables to mirror one or more tables maintained by DHCP server 90. Thus, DHCP server 90 may maintain similar tables to associate a hardware address associated with DHCP client device 20A with the IP address reserved for use by DHCP client device 20A, as described above. With respect to FIG. 1, DHCP server 16 may maintain only an address table as the additional context information need not be maintained by DHCP server 16 considering that it did not implement the automatic resource release techniques. With respect to FIG. 4, however, DHCP server 90 may maintain the one or more tables to associate the additional context information with the IP address reserved for use by DHCP client device 20A. As a result, DHCP server 90 may include both an address table, such as address table 58 of FIG. 2, and a context table, such as context table 60, or as described above a single table that combines both of address and context tables 58 and 60.

Upon the graceless failure of DHCP client device 20A and subsequent replacement of DHCP client device 20A with DHCP client device 20B, DHCP server 90 may receive yet another DHCP discover message from DHCP client device 20B. This second DHCP discover message may include a different hardware address than the first DHCP discover message from DHCP client device 20A but the same, similar or related additional context information. DHCP server 90 may parse this second DHCP discover message to determine the hardware address and perform the above described lookup to determine whether one of the address entries of address table 58 is associated with the parsed hardware address. Upon finding no corresponding address entry, DHCP server 90 may parse the second DHCP discover message to determine the additional context information and perform the above described lookup to determine whether one of the context entries of context table 60 is associated with the parsed context information.

Upon retrieving the entry previously associated with the context information parsed from the first DHCP discover device, DHCP server 90 may automatically release the IP address associated with the parsed additional context information, as DHCP server 90 may determine that DHCP client device 20A has failed gracelessly and been replaced by DHCP client device 20B. DHCP server 90 may then respond to the second DHCP discover message with a DHCP offer message contrary to DHCP server 16 of FIG. 1, which responded with a DHCP ACK message acknowledging the release of the IP address reserved for use by DHCP client device 20A. DHCP server 90 need not in this instance issue the DHCP ACK message, as it has previously determined that DHCP client device 20A is non-operational and thus will not receive any DHCP ACK message. Moreover, as a result of the lack of a DHCP relay device, DHCP server 90 may immediately respond with a DHCP offer message rather than requiring DHCP client device 20B to sent a third DHCP discover message. In this respect, communications between DHCP client device 20B and DHCP server 90 may proceed more efficiently as a result of the proximity of DHCP server 90 to DHCP client device 20B.

DHCP client device 20B and DHCP server 90 may then continue, much as DHCP client device 20A and DHCP server 90 proceeded, to reserve an IP address for use by DHCP client device 20B. Upon reserving or leasing the IP address, DHCP client device 20B may access network 14 using the reserved IP address. In this way, a server or other network device that is not an intermediate network device may implement the automatic resource release techniques to improve the efficiency with which network resources, e.g., IP addresses, are used and re-used within a network system 88.

Figure 5:
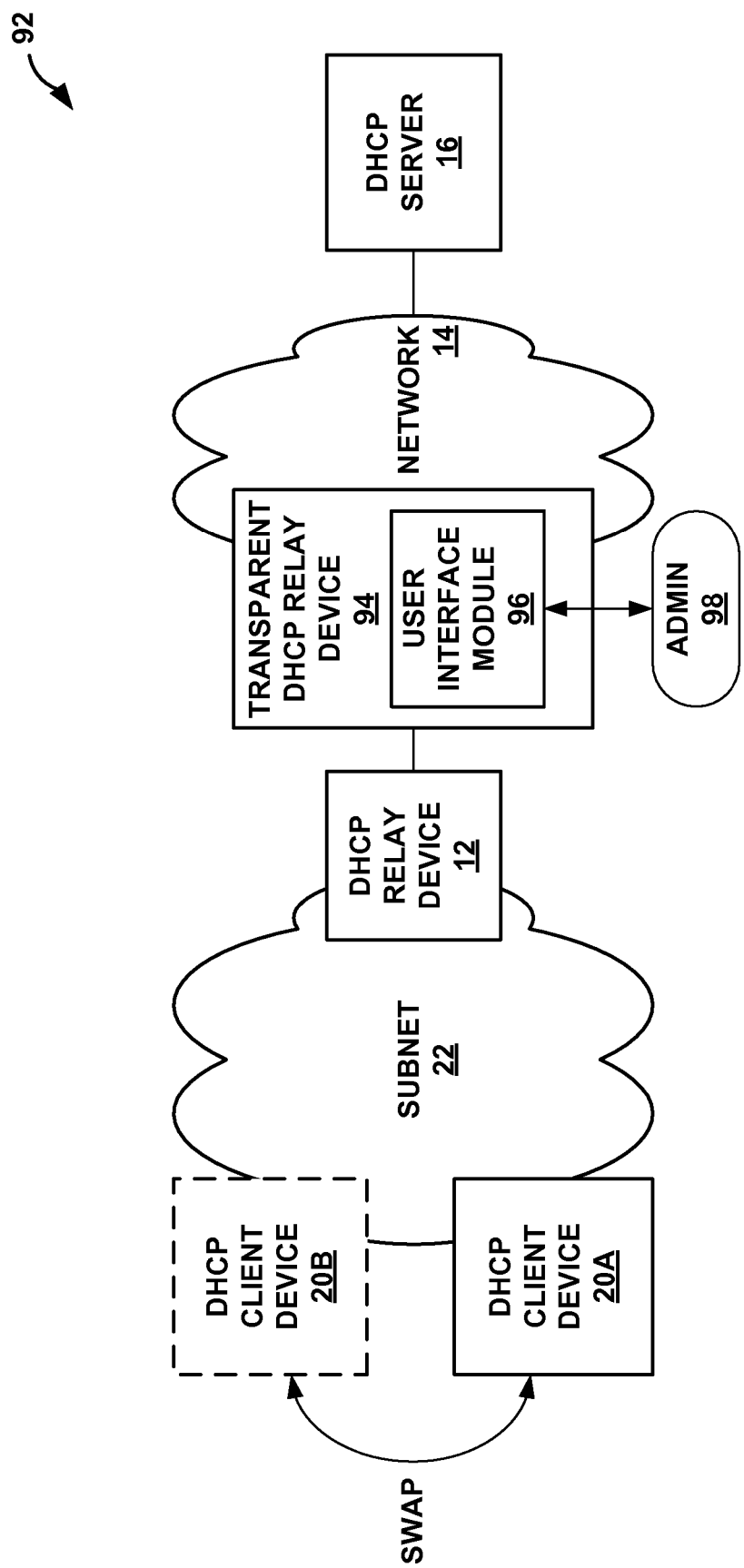
FIG. 5 is a block diagram illustrating yet another exemplary network system in which a transparent DHCP relay device implements the techniques described herein to automatically release network resources.

FIG. 5 is a block diagram illustrating another exemplary network system 92 in which a DHCP relay device 94 transparently implements the techniques described herein to automatically release network resources. Network system 92 may be similar to network system 10 of FIG. 1 in that both of systems 10 and 92 include a network 14, a DHCP relay device 12, a DHCP server 16, DHCP client devices 20A, 20B and a subnet 22. However, network system 92 further includes a transparent DHCP relay device 94 that transparently relays DHCP messages from at least one subnet, e.g., subnet 22, to DHCP server 16. DHCP relay device 94 may be "transparent" in that none of DHCP relay device 12, DHCP server 16 and DHCP client devices 20 may be aware of the presence of transparent DHCP relay device 94 within network system 92.

Transparent DHCP relay device 94 may be employed in network 14 to implement the automatic resource release techniques, as DHCP relay device 12 may not support this optional technique. Transparent DHCP relay device 94 may also be referred to as a "snooping" relay device 94 in that transparent DHCP relay device 94 may "snoop" the above described DHCP communications unicast from DHCP relay device 12 to DHCP server 16. To "snoop" these DHCP communications, transparent DHCP relay device 94 may transparently inspect, e.g., without any other device being aware of the inspection, each packet that it receives and determine whether each of these packets correspond to the DHCP protocol.

In addition to snooping these communications, DHCP relay device 94 may provide or otherwise create an access route from DHCP client device 20 to network 14 in order to facilitate delivery of these unicast DHCP communications. In other words, DHCP relay device 94 may be employed in network 14 to allow access to network 14. Often, transparent DHCP relay device 94 may implement the techniques described herein to provide additional functionality over its original purpose of creating and maintaining the access route.

Transparent DHCP relay device 94 may be substantially similar to DHCP relay device 12, as described above, in that transparent DHCP relay device 94 may include and maintain the one or more tables, e.g., tables 58 and 60, in order to associate not only hardware address, but also context information, with reserved IP addresses. Notably, DHCP relay device 94 may include a DHCP redirection module similar to redirection module 46 shown in FIG. 2, however the DHCP redirection module of device 94 may filter traffic in a slight different manner than that of DHCP redirection module 46. Rather than filter broadcast traffic, the DHCP redirection module of device 94 may only filter unicast traffic because DHCP relay device 12 may convert the broadcast traffic from DHCP client devices 20 into unicast traffic and forward the unicast traffic through DHCP relay device 94. The redirection module of DHCP relay device 94 may therefore be modified to filter only on unicast traffic and, more particular, filter traffic based on the DHCP ports discussed above without, in some instances, filtering on a combination of DHCP ports and broadcast or even unicast addresses.

Moreover, transparent DHCP relay device 94, as a result of its transparent nature, may not, in some instances, generate a DHCP release message, e.g., a DHCP message that requests release of a reserved IP address, or otherwise add or update DHCP messages. Instead, transparent DHCP relay device 94 may merely maintain the tables so as to inform or otherwise alert a network administrator of inefficient use of network resources.

For example, transparent DHCP relay device 94 may include a user interface module 96 with which a user, such as administrator 98 ("admin 98"), may interact to view these alerts, warnings or other error messages. Transparent DHCP relay device 94 may include, similar to control unit 37 shown with respect to router 36 of FIG. 2, a control unit that executes user interface module 96. Typically, user interface module 96 executes within the control plane of the control unit, such as control plane 38A, and is communicatively coupled to a DHCP module, such as DHCP module 44. The DHCP module may, upon detecting that a DHCP client device, such as DHCP client device 20A, has failed gracelessly and been replaced by another DHCP client device, such as DHCP client device 20B, in accordance with the techniques, as described above, communicate this inefficiency to user interface module 96. User interface module 96 may then generate a user interface or update a currently presented user interface and present this user interface or updated user interface to alert admin 98 of the inefficient use of an IP address.

The user interface may provide information that identifies failed DHCP client device 20A, such as the hardware address associated with DHCP client device 20A, subnet 22, the IP address reserved for the failed DHCP client device, the additional context information associated with the IP address reserved for the failed DHCP client device and any other information that may facilitate understanding of the inefficient use of the IP address, e.g., error codes, and otherwise enable admin 98 to correct the inefficiency. Admin 98 may then, based on this presented information, access DHCP server 16 to correct the inefficiency by, for example, manually releasing the IP address reserved for use by failed DHCP client device 20A. While described with respect to transparent DHCP relay device 94, other network devices, such as DHCP relay device 12 of FIG. 1 or router 36 of FIG. 2, may include a user interface module similar to user interface module 96 by which an administrator may interact to view, log, or otherwise determine or preserve errors related to inefficient use of network resources by client devices 20.

In some instances, transparent DHCP relay device 94 may act transparently on behalf of failed DHCP client device 20A by issuing a DHCP release message to mimic graceful failure of DHCP client device 20A. In other words, DHCP relay device 94 may generate a message acting as DHCP client device 20A to preserve its transparent nature, much as DHCP relay device 12 in the example of FIG. 1 generates DHCP release message 34 on behalf of DHCP client device 20A. In this respect, DHCP relay devices 12 and 94 may act as proxies for DHCP client devices 20 and therefore may be referred to as "DHCP proxy devices." While in some instances this may violate the transparent nature of these devices, such as in the case of transparent DHCP relay device 94, by acting as a proxy, transparency may still be mostly maintained. Considering the extent of inefficiencies, an administrator, such as admin 98 may decide to implement the techniques at transparent DHCP relay device 94 such that transparent DHCP relay device 94 actively generates DHCP release messages to cure the inefficiencies even if such actions arguably violate the transparent nature of that device.

While described herein with respect to a DHCP relay device that receives a DHCP request, updates that request with an Option 82 field, and forward the updated DHCP request to the DHCP server, the techniques may also be implemented by merely storing the information stored within the Option 82 field rather than updating the DHCP request with the Option 82 field and forwarding the updated DHCP request. In these instances, a network device may, in accordance with the techniques, receive the DHCP request specifying the vendor information via an Option 60 field and determine an L2 circuit by which the network message was received. The network device may then access a data structure, such as a table, within the intermediate network device to identify a IP address that is currently assigned for use within the network and associated with the same vendor context information specified in the Option 60 field of the DHCP request and the same L2 circuit by which the intermediate network device received the network message. The network device may then generate and output a message requesting that the DHCP server release the second IP address. In this respect, the techniques may be implemented without updating the DHCP request or any other DHCP communication to include the Option 82 field.

Various embodiments of the invention have been described. These and other embodiments are within the scope of the following claims.

The invention claimed is:

1. A method comprising:
   receiving, with a network device of a network, a first Dynamic Host Configuration Protocol (DHCP) discover message from a first client device of the network, wherein the first DHCP discover message requests that a first layer three (L3) network address be reserved for the first client device, wherein the first DHCP discover message includes a first identifier that uniquely identifies the first client device and an option 60 field defining a first portion of additional context information that identifies a vendor of the first client device;

determining, with the network device, a second portion of the additional context information for the first DHCP discover message from the first client device that identifies a circuit by which the network device received the first DHCP discover message, receiving, with the network device, a second DHCP discover message from a second client device of the network different from the first client device, wherein the second DHCP discover message requests that a second L3 network address be reserved for use by the second client device within the network, wherein the second DHCP discover message includes a second identifier different from the first identifier that uniquely identifies the second client device and an option 60 field defining the same first portion of the additional context information that identifies the same vendor of the second client device as that of the first client device;

determining, with the network device, the same second portion of the additional context information for the second DHCP discover message from the second client device that identifies the same circuit for the second DHCP discover message as that determined for the first DHCP discover message, determining, with the network device, whether the additional context information associated with the first and second client devices is the same;

based on the determination that the additional context information associated with the first and second client devices is the same, determining that the first client device has failed gracelessly without issuing a DHCP release message; and automatically releasing, with the network device, the first network resource reserved for use by the first client device within the network based on the determination that the first client device has failed gracelessly without issuing a DHCP release message.

2. The method of claim 1,
the method further comprises:
updating the first DHCP discover message to generate a first updated DHCP discover message by adding an option 82 field that defines the second portion of the additional context information determined for the first DHCP discover message from first client device, and
updating the second DHCP discover message to generate a second updated DHCP discover message by adding the option 82 field that defines the second portion of the additional context information determined for the second DHCP discover message from the second client device.

3. The method of claim 1, further comprising determining whether the first identifier and the second identifier are the same,
wherein determining whether the additional information included within each of the first and the second messages is the same comprises determining, based on the determination that the first and second identifiers are not the same, whether the additional context information identifying the context in which the first and second client devices operate is the same.

4. The method of claim 1,
wherein the first and second client devices both reside in a same sub-network,
wherein the network device comprises a DHCP relay device positioned between both of the first and second client devices and a DHCP server and which resides in the same sub-network as the first and second client devices,
wherein the first and second network resources comprise respective first and second Internet Protocol (IP) addresses, and
wherein the method further comprises maintaining at least one table that includes a first set of associations between the first identifier, the first IP address, and the additional context information identifying the context in which the first client device operates and a second set of associations between the second identifier, the second IP address, and the additional context information identifying the context in which the second client device operates.

5. The method of claim 4, wherein automatically releasing the first network resource comprises:
automatically generating, with the DHCP relay device, a DHCP release message that requests release of a lease reserving the first IP address for use by the first client device within the network;
automatically forwarding the DHCP release message to the DHCP server such that the DHCP server releases the lease reserving the first IP address for use by the first client device within the network; and
removing the first set of associations from the at least one table.

6. The method of claim 1,
wherein the first and second client devices both reside in a same sub-network,
wherein the network device comprises a DHCP server that resides in the same sub-network as the first and second client devices,
wherein the first and second network resources comprise respective first and second Internet Protocol (IP) addresses, and
wherein the method further comprises maintaining at least one table that includes a first set of associations between the first identifier, the first IP address, and the additional context information identifying the context in which the first client device operates and a second set of associations between the second identifier, the second IP address, and the additional context information identifying the context in which the second client device operates.

7. The method of claim 6, wherein automatically releasing the first network resource comprises removing the first set of associations from the at least one table based on the determination that the additional context information identifying the context in which the first and second client devices operate is the same.

8. The method of claim 1,
wherein the network device comprises a transparent DHCP relay device positioned between another relay device coupled to the first and second client devices and a DHCP server,
wherein the first and second network resources comprise respective first and second Internet Protocol (IP) addresses, and
wherein the method further comprises maintaining at least one table that includes a first set of associations between the first identifier, the first IP address, and the additional context information identifying the context in which the first client device operates and a second set of associations between the second identifier, the second IP address, and the additional context information identifying the context in which the second client device operates.

9. The method of claim 8, wherein automatically releasing the first network resource comprises:
   removing the first set of associations from the at least one table based on the determination that the additional context information included within the first and second messages is the same; and
   presenting via a user interface an error indicating that the first client device has failed without releasing the first IP address reserved for use by the first client device to alert an administrator to inefficient use of the first IP address.

10. The method of claim 1,
   wherein the first identifier comprises one of a layer two (L2) hardware address or a client identifier specified in an option 61 field of the first message, and
   wherein the second identifier comprises one of a L2 hardware address or a client identifier specified in an option 61 field of the second message.

11. A network device included within a network comprising:
   at least one interface card that (1) receives a first Dynamic Host Configuration Protocol (DHCP) discover message from a first client device of the network, wherein the first DHCP discover message requests that a first layer three (L3) network address be reserved for the first client device, wherein the first DHCP discover message includes a first identifier that uniquely identifies the first client device and an option 60 field defining a first portion of additional context information that identifies a vendor of the first client device and (2) receives a second DHCP discover message from a second client device of the network different from the first client device, wherein the second DHCP discover message requests that a second L3 network address be reserved for use by the second client device within the network, wherein the second DHCP discover message includes a second identifier different from the first identifier that uniquely identifies the second client device and an option 60 field defining the same first portion of the additional context information that identifies the same vendor of the second client device as that of the first client device; and
   a control unit that determines a second portion of the additional context information for the first DHCP discover message from the first client device that identifies a circuit by which the network device received the first DHCP discover message, determining the same second portion of the additional context information for the second DHCP discover message from the second client device that identifies the same circuit for the second DHCP discover message as that determined for the first DHCP discover message, determines whether the additional information identifying the context in which the first and second client devices operate is the same, based on the determination that the additional context information associated with the first and second client devices is the same, determine that the first client device has failed gracelessly without issuing a DHCP release message, and automatically releases the first network resource reserved for use by the first client device within the network based on the determination that the first client device has failed gracelessly without issuing a DHCP release message.

12. The network device of claim 11,
   wherein the control unit includes a DHCP module that updates the first DHCP discover message to generate a first updated DHCP discover message by adding an option 82 field that defines the second portion of the additional context information determined for the first DHCP discover message from the first client device, and updates the second DHCP discover message to generate a second updated DHCP discover message by adding the option 82 field that defines the second portion of the additional context information determined for the second DHCP discover message from the second client device.

13. The network device of claim 11, wherein the control unit includes a protocol module that determines whether the first identifier and the second identifier are the same and determines, based on the determination that the first and second identifier are not the same, whether the additional context information included within each of the first and second messages is the same.

14. The network device of claim 11,
   wherein the first and second client devices both reside in a same sub-network,
   wherein the network device comprises a DHCP relay device positioned between the first and second client devices and a DHCP server and which resides in the same sub-network as the first and second client devices,
   wherein the first and second network resources comprise respective first and second Internet Protocol (IP) addresses, and
   wherein the control unit includes a DHCP module that maintains at least one table that includes a first set of associations between the first identifier, the first IP address, and the additional context information identifying the context in which the first client device operates and a second set of associations between the second identifier, the second IP address, and the additional context information identifying the context in which the second client device operates.

15. The network device of claim 14,
   wherein the DHCP module automatically generates a DHCP release message that requests release of a lease reserving the first IP address for use by the first client device within the network,
   wherein the at least one interface card automatically forwards the DHCP release message to the DHCP server such that the DHCP server releases the lease reserving the first IP address for use by the first client device within the network, and
   wherein the DHCP module removes the first set of associations.

16. The network device of claim 11,
   wherein the first and second client devices both reside in a same sub-network,
   wherein the network device comprises a DHCP server that resides in the same sub-network as the first and second client devices,
   wherein the first and second network resources comprise respective first and second Internet Protocol (IP) addresses, and
   wherein the control unit includes a DHCP module that maintains at least one table that includes a first set of associations between the first identifier, the first IP address, and the additional context information identifying the context in which the first client device operates and a second set of associations between the second identifier, the second IP address, and the additional context information identifying the context in which the second client device operates.

17. The network device of claim 16, wherein the DHCP module removes the first set of associations from the at least one table based on the determination that the additional context information identifying the context in which the first and second client devices operate is the same.

18. The network device of claim 11,
wherein the network device comprises a transparent DHCP relay device positioned between the first and second client devices and a DHCP server,
wherein the first and second network resources comprise respective first and second Internet Protocol (IP) addresses, and
wherein the control unit includes a DHCP module that maintains at least one table that includes a first set of associations between the first identifier, the first IP address, and the additional context information identifying the context in which the first client device operates and a second set of associations between the second identifier, the second IP address, and the additional context information identifying the context in which the second client device operates.

19. The network device of claim 18,
wherein the DHCP module further removes the first set of associations from the at least one table based on the determination that the additional context information included within the first and second messages is the same, and
wherein the control unit includes a user interface module that presents via a user interface an error indicating that the first client device has failed without releasing the first IP address reserved for use by the first client device to alert an administrator to inefficient use of the first IP address.

20. The network device of claim 11,
wherein the first identifier comprises one of a layer two (L2) hardware address or a client identifier specified in an option 61 field of the first message, and
wherein the second identifier comprises one of a L2 hardware address or a client identifier specified in an option 61 field of the second message.

21. A network system comprising:
a network;
a sub-network that includes a first and a second client device; and
a network device comprising:
at least one interface card that (1) receives a first Dynamic Host Configuration Protocol (DHCP) discover message from the first client device of the network, wherein the first DHCP discover message requests that a first layer three (L3) network address be reserved for the first client device, wherein the first DHCP discover message includes a first identifier that uniquely identifies the first client device and an option 60 field defining a first portion of additional context information that identifies a vendor of the first client device and (2) receives a second DHCP discover message from the second client device of the network different from the first client device, wherein the second DHCP discover message requests that a second L3 network address be reserved for use by the second client device within the network, wherein the second DHCP discover message includes a second identifier different from the first identifier that uniquely identifies the second client device and an option 60 field defining the same first portion of the additional context information that identifies the same vendor of the second client device as that of the first client device; and
a control unit that determines a second portion of the additional context information for the first DHCP discover message from the first client device that identifies a circuit by which the network device received the first DHCP discover message, determining the same second portion of the additional context information for the second DHCP discover message from the second client device that identifies the same circuit for the second DHCP discover message as that determined for the first DHCP discover message, determines whether the additional information identifying the context in which the first and second client devices operate is the same, based on the determination that the additional context information associated with the first and second client devices is the same, determine that the first client device has failed gracelessly without issuing a DHCP release message, and automatically releases the first network resource reserved for use by the first client device within the network based on the determination that the first client device has failed gracelessly without issuing a DHCP release message.

22. The network system of claim 21,
wherein the control unit includes a DHCP module that updates the first DHCP discover message to generate a first updated DHCP discover message by adding an option 82 field that defines the second portion of the additional context information determined for the first DHCP discover message from the first client device, and updates the second DHCP discover message to generate a second updated DHCP discover message by adding the option 82 field that defines the second portion of the additional context information determined for the second DHCP discover message from the second client device.

23. The network system of claim 21, wherein the control unit includes a protocol module that determines whether the first identifier and the second identifier are the same and determines, based on the determination that the first and second identifier are not the same, whether the additional context information included within each of the first and second messages is the same.

24. The network device of claim 21,
wherein the first and second client devices both reside in a same sub-network,
wherein the network device comprises a DHCP relay device positioned between the first and second client devices and a DHCP server and which resides in the same sub-network as the first and second client devices,
wherein the first and second network resources comprise respective first and second Internet Protocol (IP) addresses, and
wherein the control unit includes a DHCP module that maintains at least one table that includes a first set of associations between the first identifier, the first IP address, and the additional context information identifying the context in which the first client device operates and a second set of associations between the second identifier, the second IP address, and the additional context information identifying the context in which the second client device operates.

25. The network system of claim 24,
wherein the DHCP module automatically generates a DHCP release message that requests release of a lease reserving the first IP address for use by the first client device within the network,
wherein the at least one interface card automatically forwards the DHCP release message to the DHCP server such that the DHCP server releases the lease reserving the first IP address for use by the first client device within the network, and wherein the DHCP module removes the first set of associations.

26. The network system of claim 21, wherein the first and second client devices both reside in a same sub-network, wherein the network device comprises a DHCP server that resides in the same sub-network as the first and second client devices, wherein the first and second network resources comprise respective first and second Internet Protocol (IP) addresses, and wherein the control unit includes a DHCP module that maintains at least one table that includes a first set of associations between the first identifier, the first IP address, and the additional context information identifying the context in which the first client device operates and a second set of associations between the second identifier, the second IP address, and the additional context information identifying the context in which the second client device operates.

27. The network system of claim 26, wherein the DHCP module removes the first set of associations from the at least one table based on the determination that the additional context information identifying the context in which the first and second client devices operate is the same.

28. The network system of claim 21, wherein the network device comprises a transparent DHCP relay device positioned between the first and second client devices and a DHCP server, wherein the first and second network resources comprise respective first and second Internet Protocol (IP) addresses, and wherein the control unit includes a DHCP module that maintains at least one table that includes a first set of associations between the first identifier, the first IP address, and the additional context information identifying the context in which the first client device operates and a second set of associations between the second identifier, the second IP address, and the additional context information identifying the context in which the second client device operates.

29. The network system of claim 28, wherein the DHCP module further removes the first set of associations from the at least one table based on the determination that the additional context information included within the first and second messages is the same, and wherein the control unit includes a user interface module that presents via a user interface an error indicating that the first client device has failed without releasing the first IP address reserved for use by the first client device to alert an administrator to inefficient use of the first IP address.

30. The network system of claim 21, wherein the first identifier comprises one of a layer two (L2) hardware address or a client identifier specified in an option 61 field of the first message, and wherein the second identifier comprises one of a L2 hardware address or a client identifier specified in an option 61 field of the second message.

31. A non-transitory computer-readable storage medium comprising instruction for causing a programmable processor to:

receive, with a network device of a network, a first Dynamic Host Configuration Protocol (DHCP) discover message from a first client device of the network, wherein the first DHCP discover message requests that a first layer three (L3) network address be reserved for the first client device, wherein the first DHCP discover message includes a first identifier that uniquely identifies the first client device and an option 60 field defining a first portion of additional context information that identifies a vendor of the first client device;

determine, with the network device, a second portion of the additional context information for the first DHCP discover message from the first client device that identifies a circuit by which the network device received the first DHCP discover message, receive, with the network device, a second DHCP discover message from a second client device of the network different from the first client device, wherein the second DHCP discover message requests that a second L3 network address be reserved for use by the second client device within the network, wherein the second DHCP discover message includes a second identifier different from the first identifier that uniquely identifies the second client device and an option 60 field defining the same first portion of the additional context information that identifies the same vendor of the second client device as that of the first client device;

determine, with the network device, the same second portion of the additional context information for the second DHCP discover message from the second client device that identifies the same circuit for the second DHCP discover message as that determined for the first DHCP discover message, determine, with the network device, whether the additional information associated with the first and second client devices is the same;

based on the determination that the additional context information associated with the first and second client devices is the same, determine that the first client device has failed gracelessly without issuing a DHCP release message, and automatically release, with the network device, the first network resource reserved for use by the first client device within the network based on the determination that the first client device has failed gracelessly without issuing a DHCP release message.

32. A method comprising:

receiving, with an intermediate network device positioned between a subscriber device and a network address allocation device within a network, a network message from the subscriber device requesting that a layer three (L3) network address be reserved for use by the subscriber device within the network, wherein the network message includes a identifier that uniquely identifies the subscriber device and vendor context information that identifies a vendor of the subscriber device;

determining, with the intermediate device, an L2 circuit by which the network message was received;

accessing a data structure within the intermediate network device to identify a second L3 network address that is currently assigned for use within the network and associated with the same vendor context information specified in the network message and the same L2 circuit by which the intermediate network device received the network message; and generating and outputting, with the intermediate device, a message requesting the network address allocation device release the second L3 network address.

* * * * *